United States Patent [19]
Washisu

[11] Patent Number: 6,122,447
[45] Date of Patent: *Sep. 19, 2000

[54] IMAGE BLUR PREVENTION APPARATUS

[75] Inventor: Koichi Washisu, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/621,654

[22] Filed: Mar. 26, 1996

[30] Foreign Application Priority Data

Mar. 27, 1995 [JP] Japan ................................ 7-067860

[51] Int. Cl.$^7$ .............................. G03B 15/00; G03B 7/08
[52] U.S. Cl. ................................................. 396/55; 396/91
[58] Field of Search .................. 396/52, 53, 54, 396/55, 91–93; 348/208

[56] References Cited

U.S. PATENT DOCUMENTS

| | | | |
|---|---|---|---|
| 4,965,619 | 10/1990 | Shikaumi et al. ................. | 354/410 |
| 5,020,369 | 6/1991 | Washisu et al. .................... | 73/517 A |
| 5,117,246 | 5/1992 | Takahashi et al. ................ | 396/55 |
| 5,539,496 | 7/1996 | Wakabayashi et al. ............ | 396/55 |

*Primary Examiner*—Safet Metjahic
*Assistant Examiner*—Michael Dalakis
*Attorney, Agent, or Firm*—Fitzpatrick, Cella, Harper & Scinto

[57] ABSTRACT

In an image blur prevention device a control device changes the image blur prevention device (fluctuation detection sensor) into a predetermined state (a non-operation state) in accordance with a first operation (e.g., release of depression of a shutter release button of a camera) at the time when a predetermined time has elapsed since the first operation and, when a second operation (e.g., depression of the shutter release button of the camera) is executed before the predetermined time has elapsed, the control device operates to regulate the change of the image blur prevention device into the predetermined state and to maintain the image blur prevention device in the first state (the operation state).

37 Claims, 33 Drawing Sheets

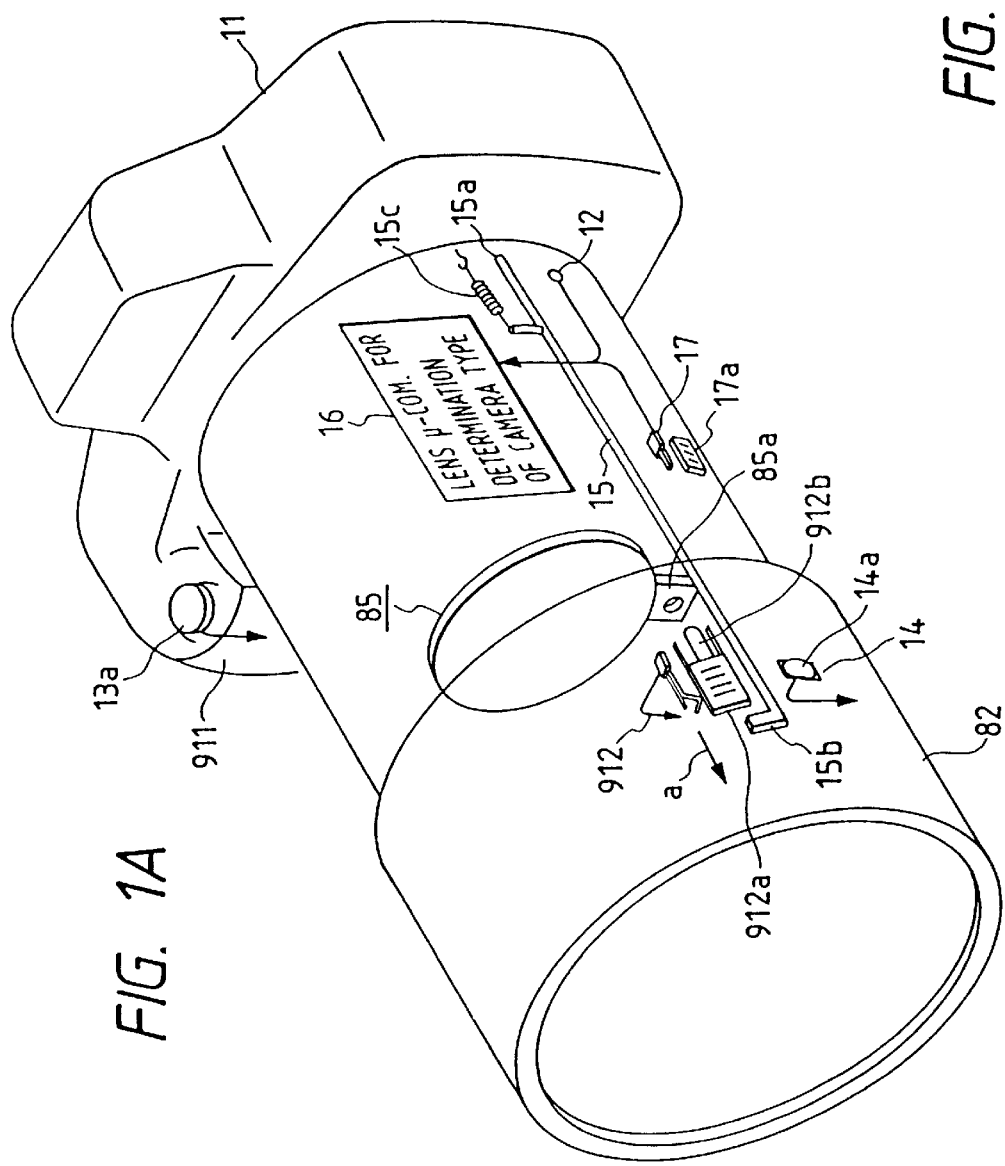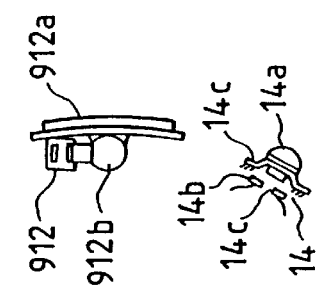

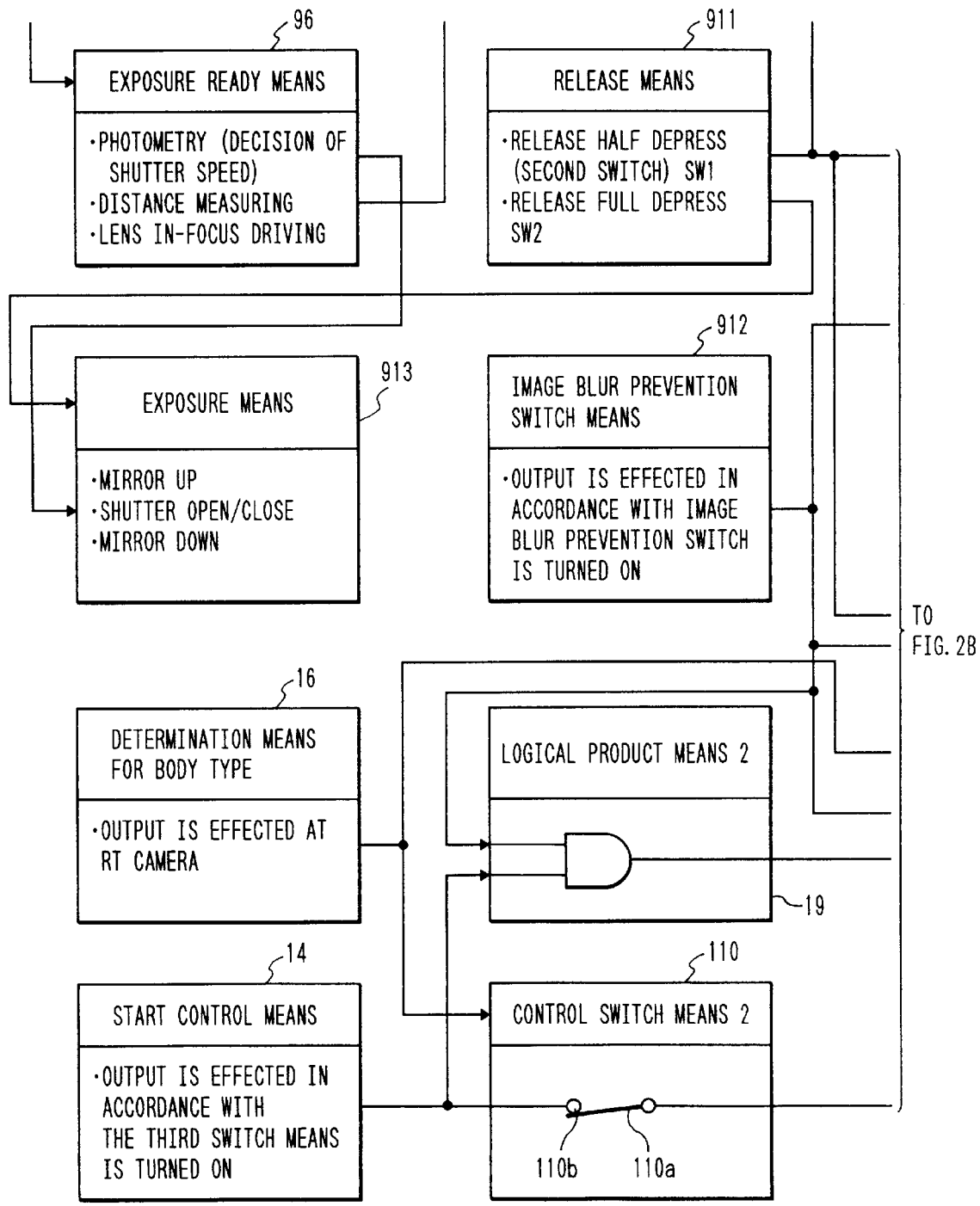

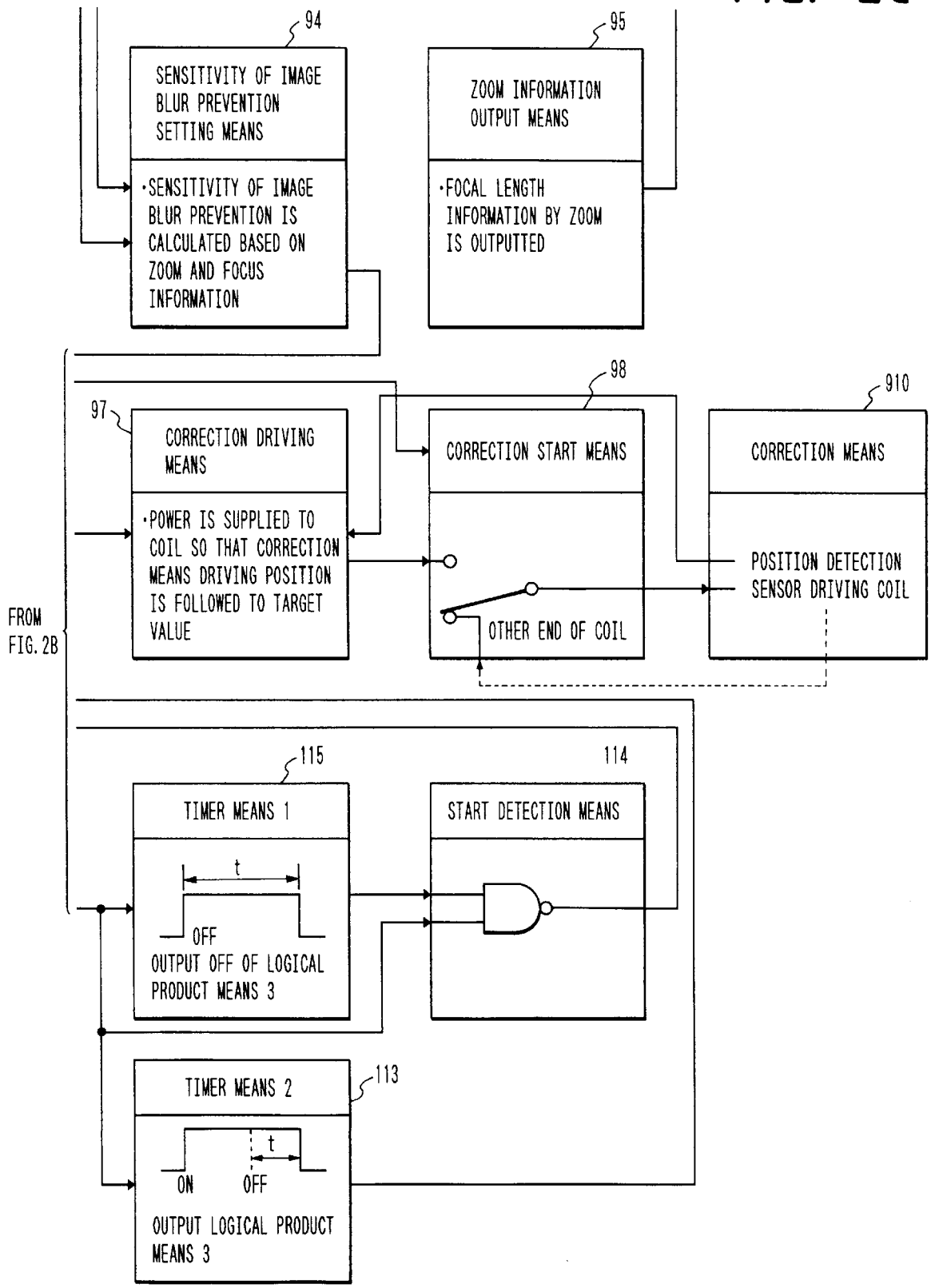

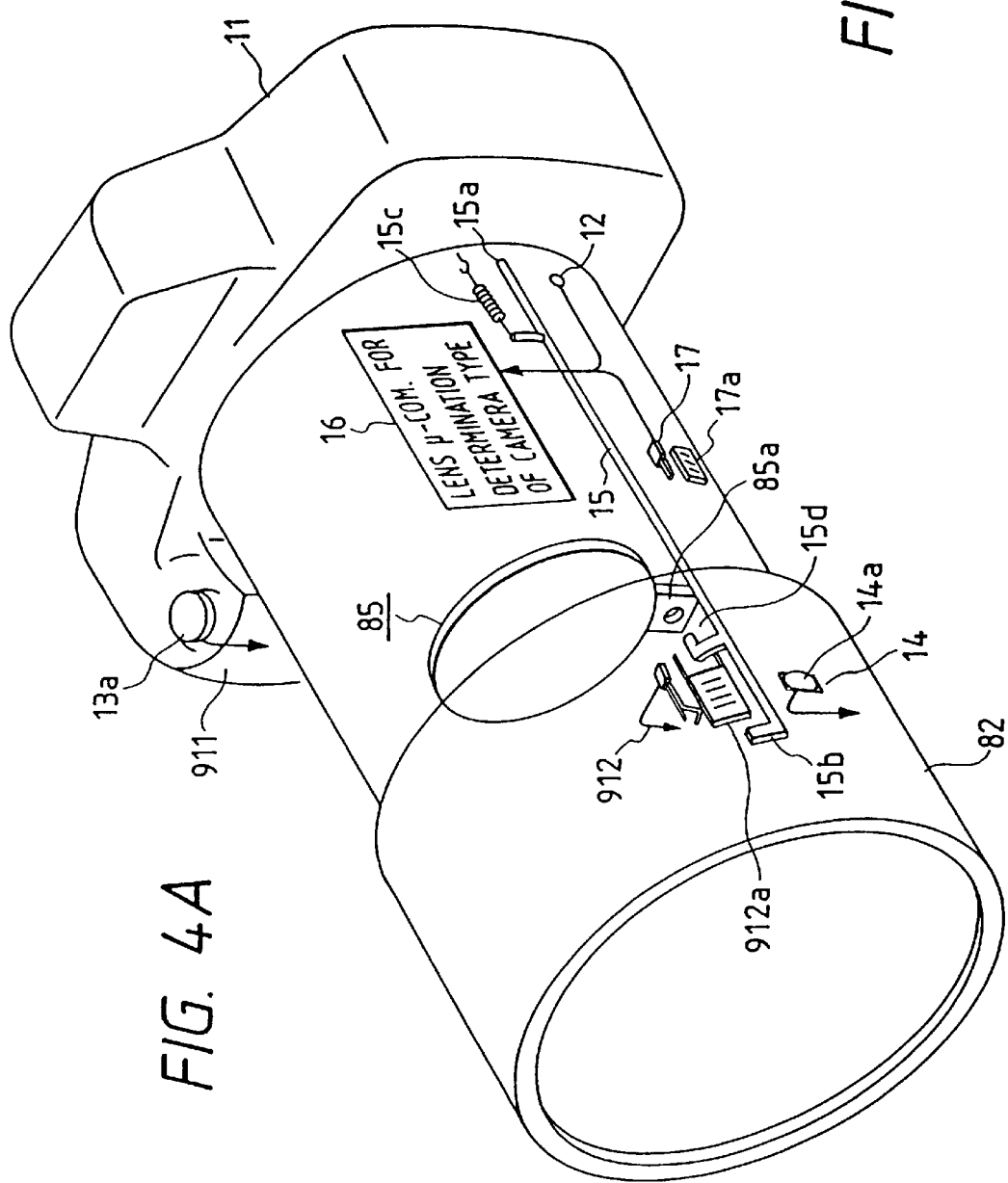
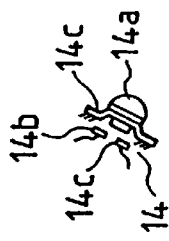
FIG. 4A
FIG. 4B

| FIG.5A | FIG.5B | FIG.5C |

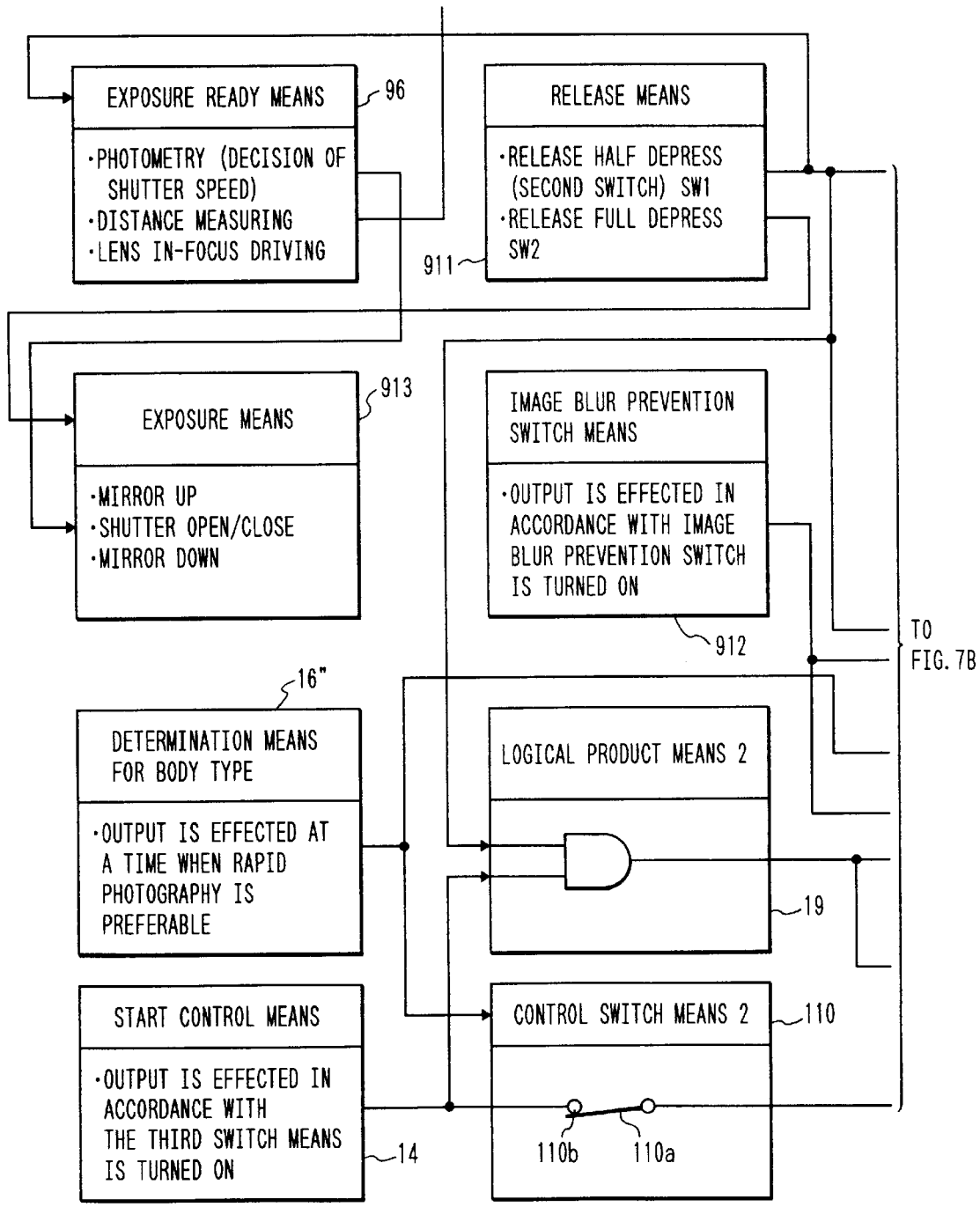

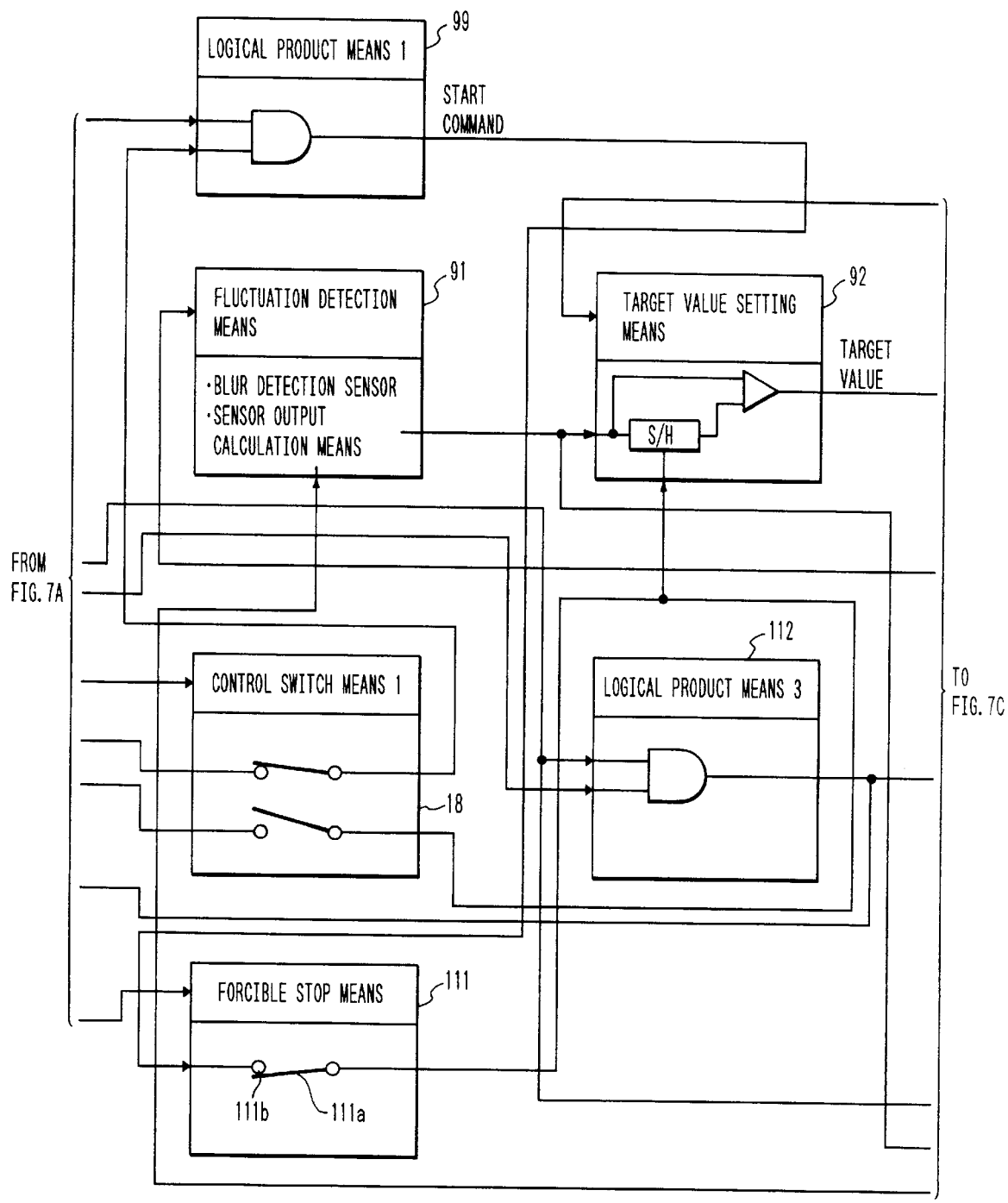

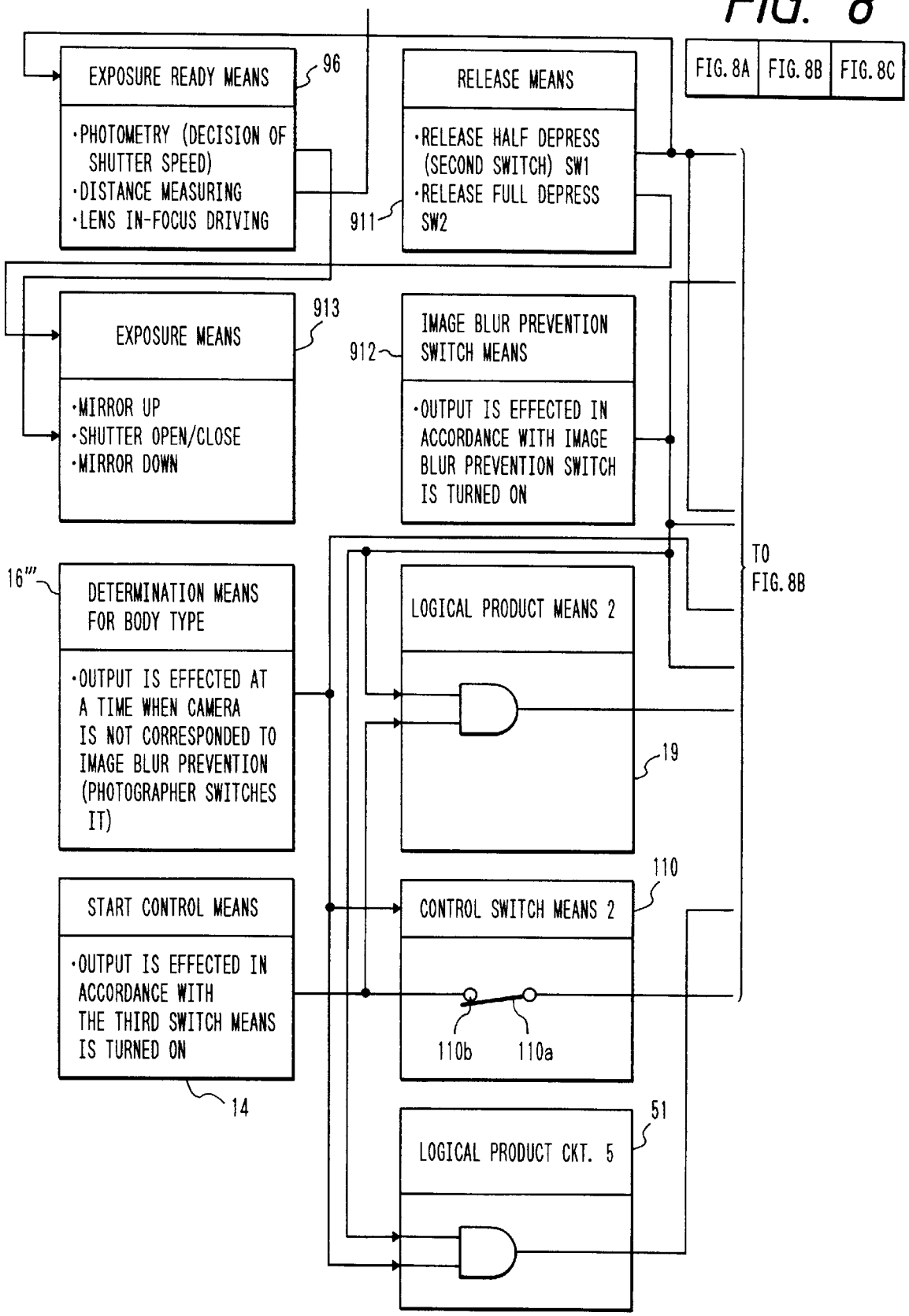

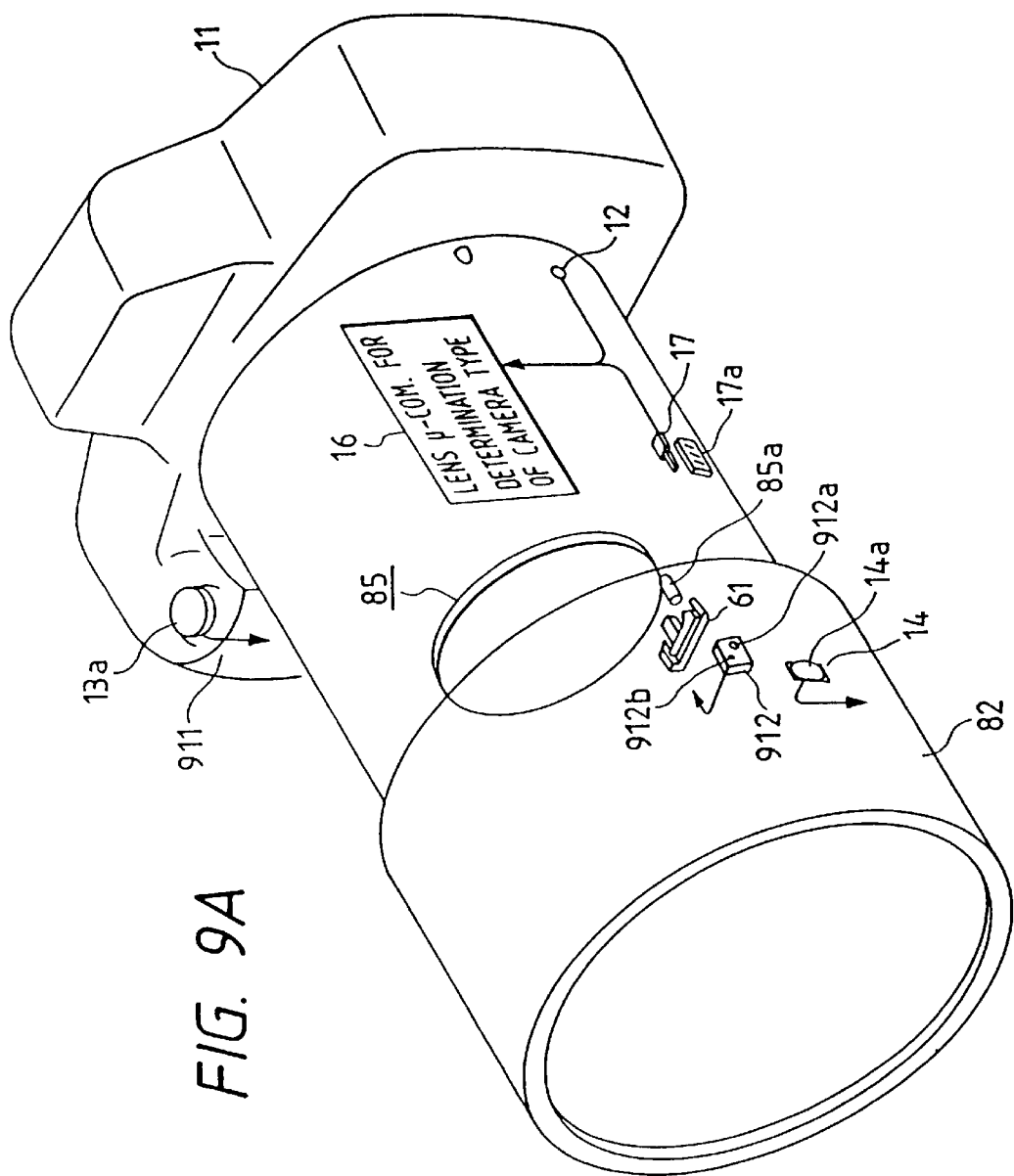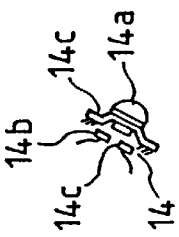

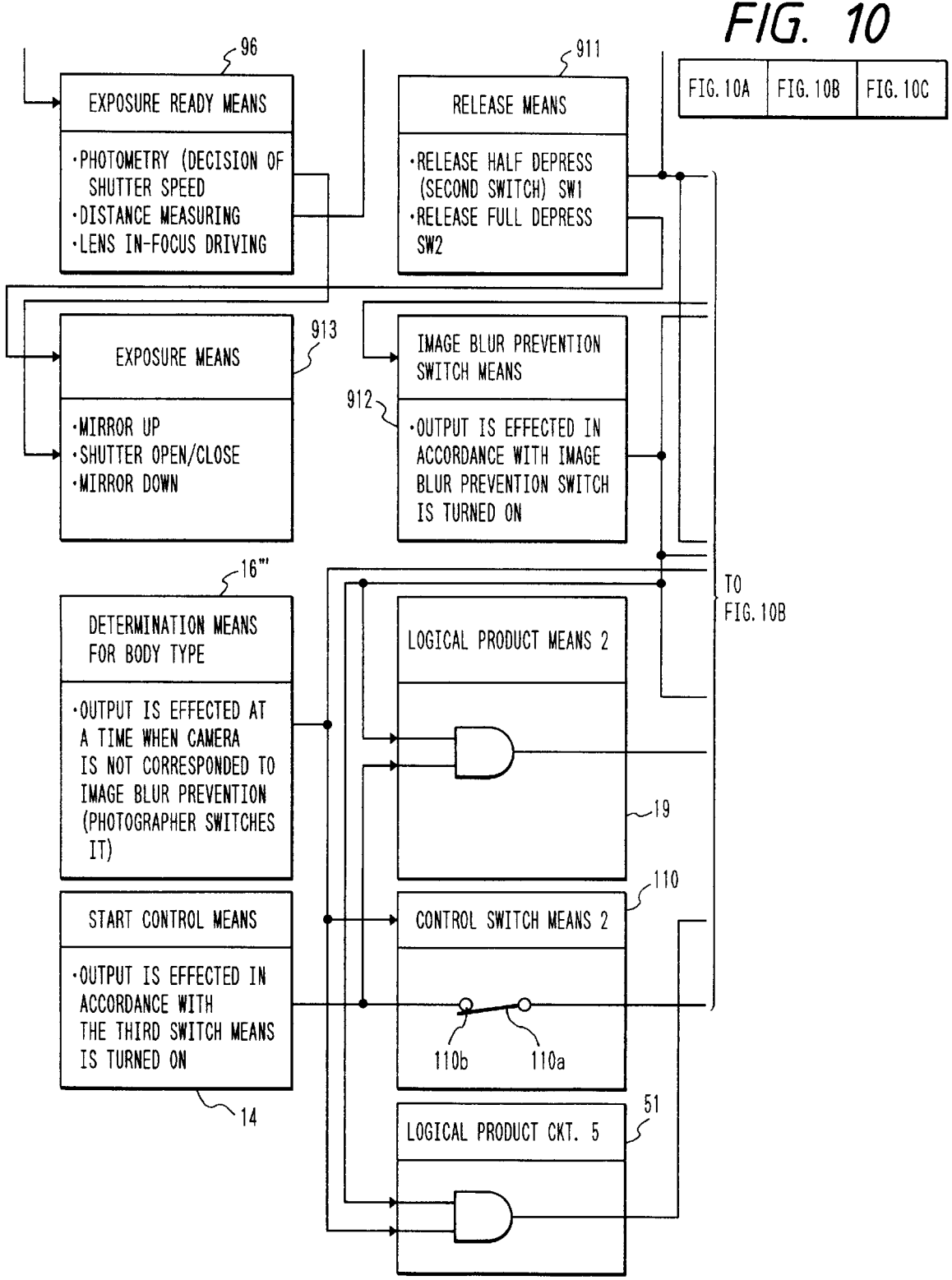

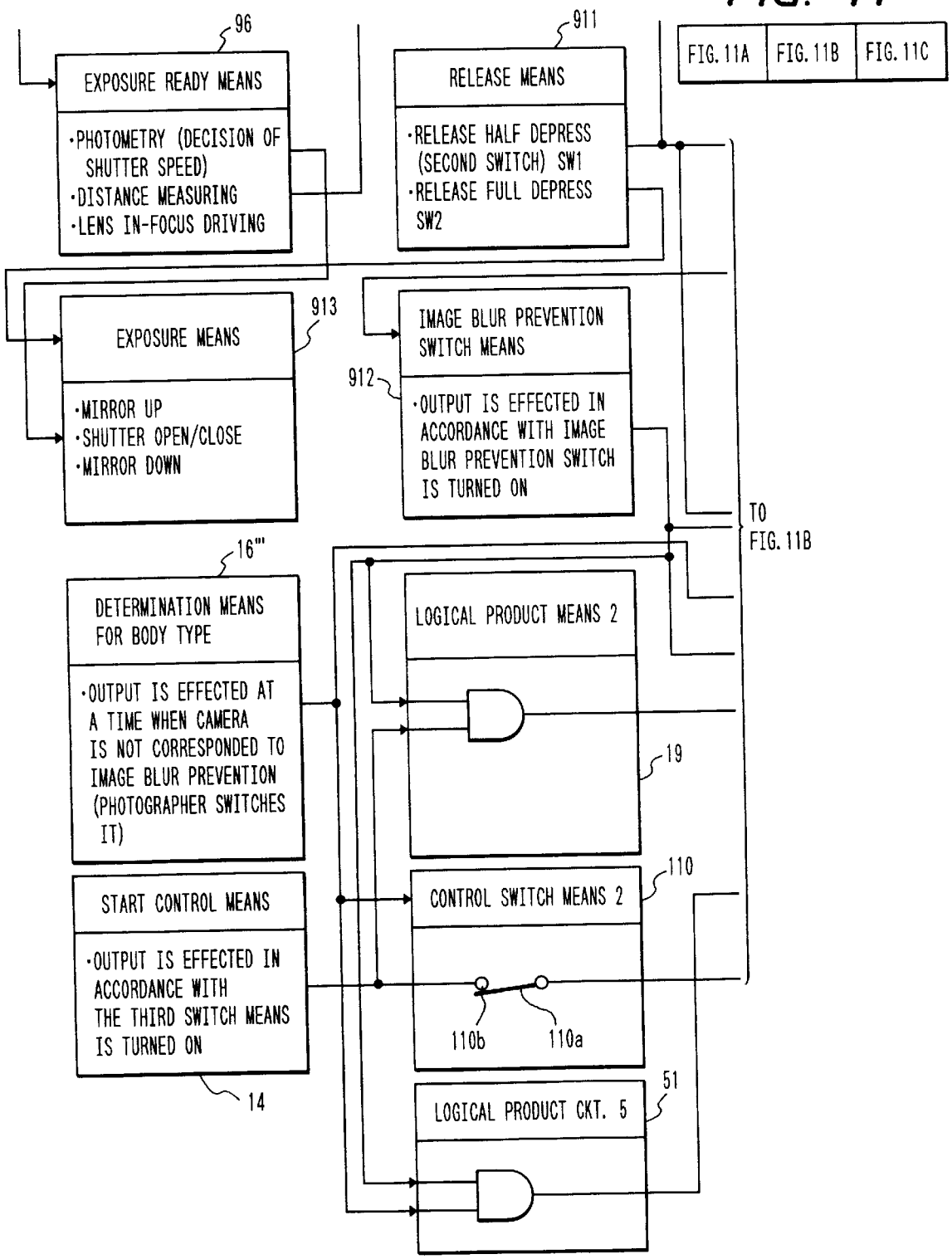

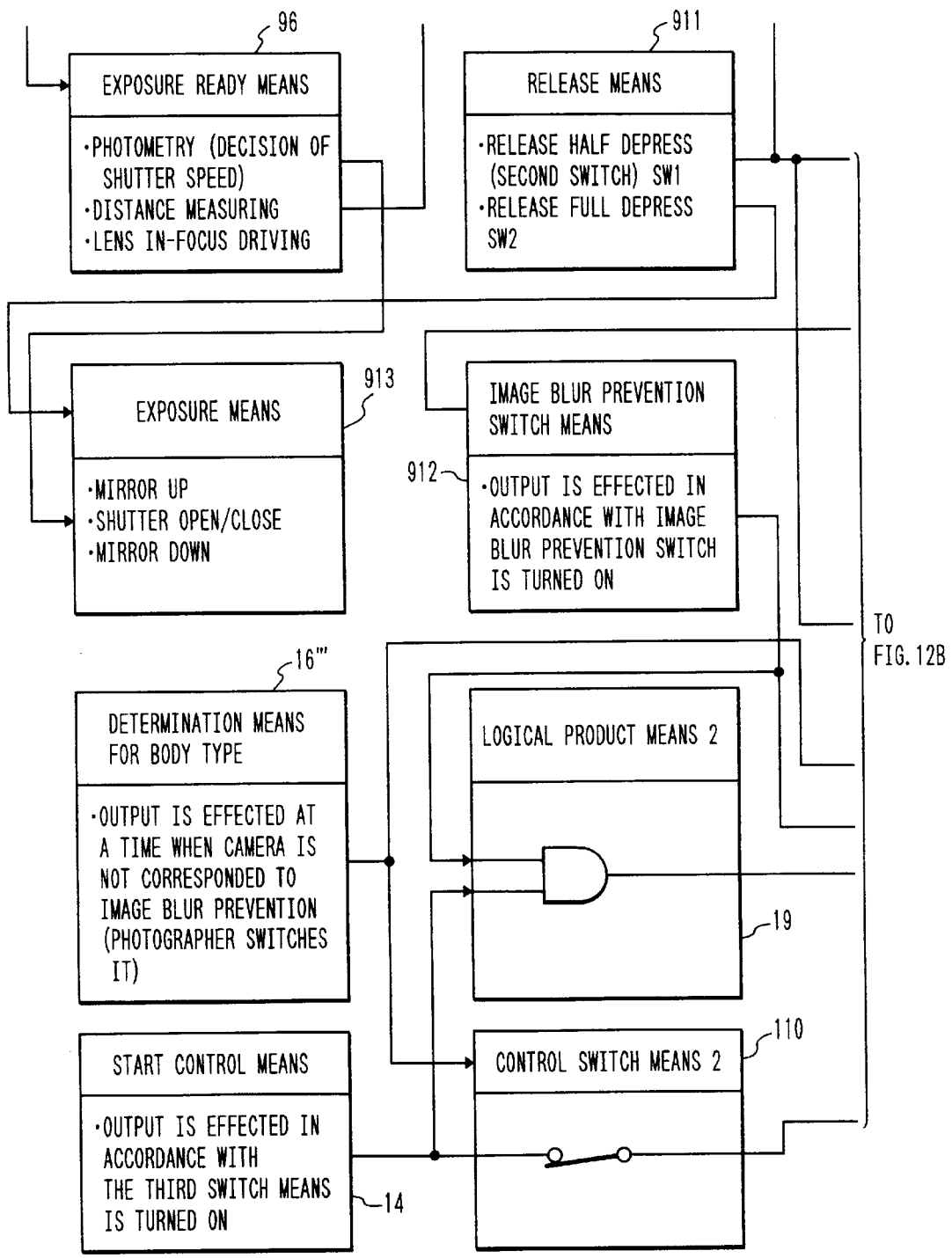

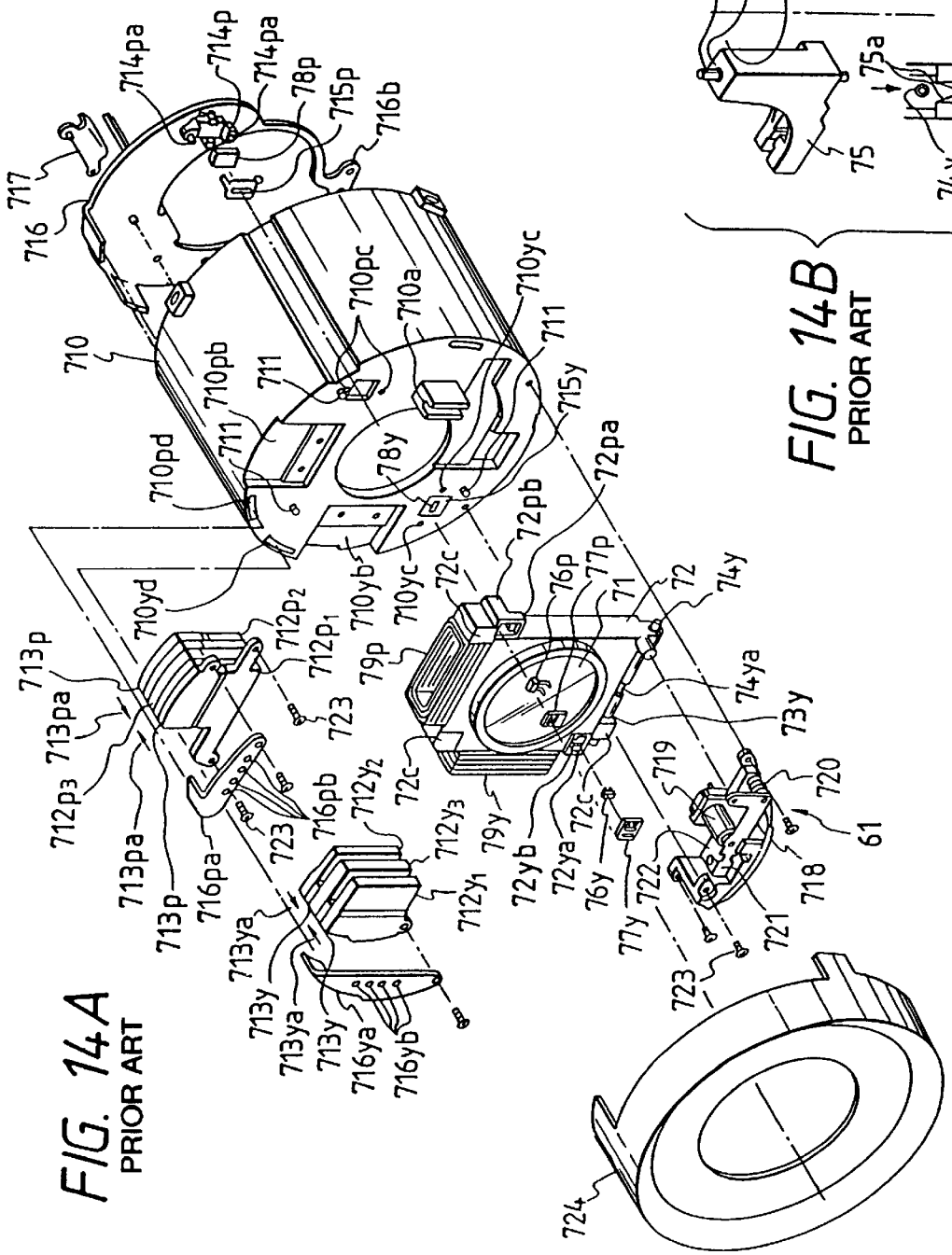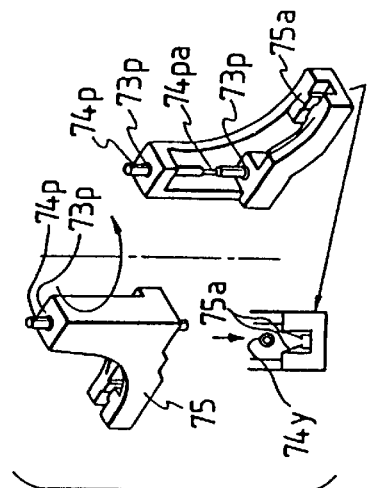
FIG. 14A PRIOR ART
FIG. 14B PRIOR ART

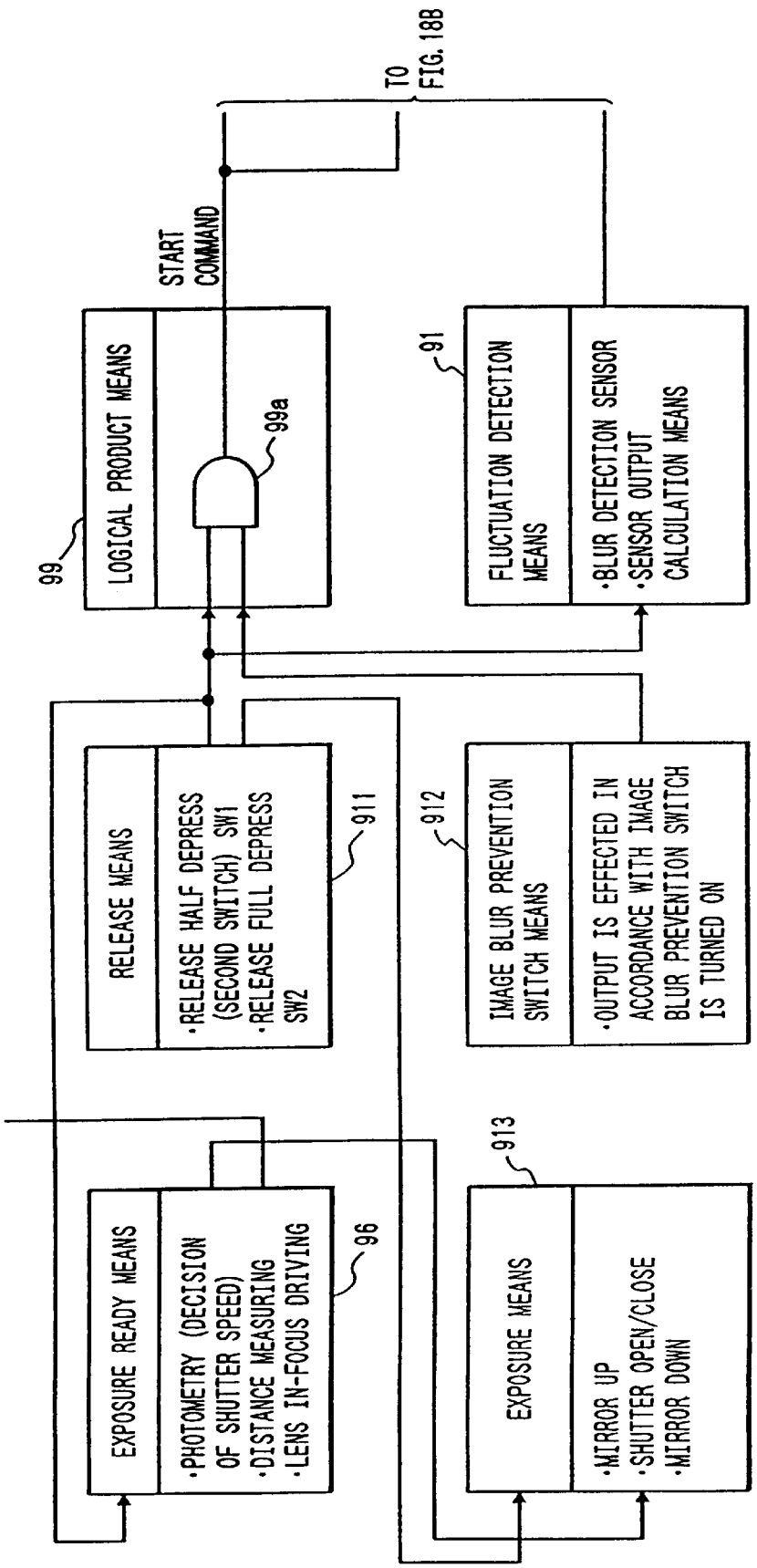

IMAGE BLUR PREVENTION APPARATUS

BACKGROUND OF THE INVENTION

1. Field of the Invention

The present invention relates to an image blur prevention apparatus for preventing an image blur occurring in cameras, optical equipment, and so on.

2. Related Background Art

Video cameras or still cameras incorporating an image blur prevention apparatus are currently available, and such cameras are effective to take photographs with little fluctuation.

There are two types of image blur prevention apparatus mounted in such cameras, one of which is a type for effecting fluctuation correction by detecting fluctuation (vibration) of the camera from an image signal and correcting an electronic video signal, based thereon, and the other of which is a type for effecting fluctuation correction by mechanically and optically detecting fluctuation of the camera and mechanically and optically correcting the fluctuation. Each of these two types has both merits and drawbacks.

Explained below is a conventional example of a camera or a lens barrel as an optical device incorporating the image blur prevention apparatus based on the mechanical and optical principle.

The image blur prevention apparatus is comprised of, a well known, a fluctuation sensor for detecting an angular displacement, an angular acceleration, or an angular velocity of the optical device, a correcting means for correcting an image blur of the image plane, based on an output from the sensor, and a control means for controlling the fluctuation sensor and the correcting means.

FIG. 13 is a drawing for explaining a configuration of an image blur prevention apparatus using an angular velocity meter as a fluctuation sensor, which is a drawing to illustrate the principle of the image blur prevention apparatus for suppressing image blur due to vertical fluctuation $81p$ and lateral fluctuation $81y$ in the directions along arrows 81. In the drawing, reference numeral 82 designates a lens barrel of the camera, $83p$ an angular velocity meter for detecting an angular velocity of vertical fluctuation, $83y$ an angular velocity meter for detecting an angular velocity of lateral fluctuation, $84p$ a vertical detection output from the angular velocity meter $83p$, $84y$ a lateral detection output from the angular velocity meter $83y$, 85 a correction optical means, $86p$ and $86y$ drive coils of the correction optical means 85, and $87p$ and $87y$ position sensors for detecting vertical movement and lateral movement of the correction optical means 85.

In this image blur prevention apparatus, the image blur is corrected on the image plane 88 in such a manner that a control circuit (not shown) drives the correction optical means 85 by electric currents supplied to the drive coils $86p$ and $86y$, based on the outputs $84p$ and $84y$ from the angular velocity meters $83p$ and $83y$.

FIGS. 14A and 14B are structural drawings to show an example of a lens barrel having the correcting means formed based on the principle of image blur prevention as explained with FIG. 13, in which bearings $73y$ are pressed into a support frame 72 incorporating a lens 71 as a correction optical element, mounted by caulking. A support shaft $74y$ is supported on the bearings $73y$ so as to be slidable along the axial direction. A recess $74ya$ of the support shaft $74y$ is snap-fit with claws $75a$ of a support arm 75. Further, bearings $73p$ are also pressed into the support arm 75 so that a support shaft $74p$ can be supported as slidable along the axial direction.

FIG. 14B also includes a back side view of the support arm 75 at its lower right corner.

Light emitters $76p$, $76y$ such as IREDs are bonded in emitter mount holes $72pa$, $72ya$ in the support frame 72, and their terminals are soldered to lid $77p$, $77y$ (bonded to the support frame 72) also serving as a connection board. Slits $72pb$, $72yb$ are formed in the support frame 72 and light emitted from the light emitter $76p$, $76y$ travels through the slit $72pb$, $72yb$ to enter a PSD $78p$, $78y$ as described below.

Coils $79p$, $79y$ (corresponding to the coils $86p$, $86y$ in FIG. 13) are also bonded to the support frame 72 and their terminals are soldered to the lid $77p$, $77y$.

Support balls 711 are fit (at three positions) in the lens barrel 710, and a recess $74pa$ of the support shaft $74p$ is snap-fit with claws $710a$ of the barrel 710.

Yokes $712p_1$, $712p_2$, $712p_3$, and magnets $713p$ are bonded in a stack, and similarly, yokes $712y_1$, $712y_2$, $712y_3$, and magnets $713y$ are also bonded in a stack. The polarities of the magnets are arranged as represented by the arrows $713pa$, $713ya$.

The yokes $712p_2$, $712y_2$ are screwed in associated recesses $710pb$, $710yb$ of the barrel 710.

The position detectors $78p$, $78y$ such as PSDs are bonded to sensor seats $714p$, $714y$ (among which $714y$ is not shown) and the terminals of the position detectors $78p$, $78y$ (corresponding to the sensors $87p$, $87y$ in FIG. 13) are soldered to a flexible board (flexible printed-circuit board) 716, as being covered by sensor masks $715p$, $715y$. Dowels $714pa$, $714ya$ (among which $714ya$ is not shown) of the sensor seats $714p$, $714y$ are fit in mount holes $710pc$, $710yc$ of the barrel 710 and the flexible board 716 is screwed to the barrel 710 using a flexible stay 717. Each ear $716pa$, $716ya$ of the flexible board 716 is set through a hole $710pd$, $710yd$ of the barrel 710 to be screwed onto the yoke $712p_1$, $712y_1$, and the coil terminals and emitter terminals on the lids $77p$, $77y$ are connected to land portions $716pb$, $716yb$ of the ears $716pa$, $716ya$ of the flexible board 716 and to polyurethane copper wires (three-stranded wires).

A plunger 719 is screwed to a mechanical rocking chassis 718, and a mechanical rocking arm 721 charging a spring 720 is screwed to the mechanical rocking chassis 718 so that the plunger 719 can rotate about a fitting shaft screw 722.

The mechanical rocking chassis 718 is screwed to the barrel 710, and the terminals of the plunger 719 are soldered to lands $716b$ of the flexible board 716.

Adjusting screws 723 (at three positions) having spherical tips are screwed through the yoke $712p$ and the mechanical rocking chassis 718, so that sliding surfaces (hatched portions $72c$) of the support frame 72 are sandwiched between the adjusting screws 723 and the support balls 711. The adjusting screws 723 are adjusted to be screwed as opposed to the sliding surfaces with a small clearance.

A cover 724 is bonded to the barrel 710 to cover the correction optical means 85 as described above.

FIG. 15 is a block diagram to show an example of a drive control circuit of the correction optical means, in which an output from the position detector $78p$, $78y$ is amplified by an amplification circuit $727p$, $727y$ and the thus amplified signal is input into the coil $79p$, $79y$ to drive the support frame, thereby changing the output from the position detector $78p$, $78y$. When the drive directions (the polarities) of the coils $79p$, $79y$ are set so as to decrease the outputs from the position detectors $78p$, $78y$ (in negative feedback), the drive force of the coils 79p, 79y stabilizes the support frame 72 at a position where the outputs from the position detectors 78p, 78y become nearly zero.

Compensation circuits 728p, 728y are circuits for further stabilizing the control system, and driving circuits 729p, 729y are circuits for making up for currents applied to the coils 79p, 79y.

When command signals 730p, 730y are supplied from the outside to the system of FIG. 15, the support frame is driven so as to be very faithful to the command signals 730p, 730y.

The technique for controlling the coils by negatively feeding the position detection outputs back as in the control system of FIG. 15 is called as a position control technique, in which, when an amount of hand fluctuation is given as a command signal 730p, 730y, the support frame 72 is driven in proportion with the amount of hand fluctuation.

FIG. 16 is a detailed diagram to show a specific example of the drive control circuit of FIG. 15 for driving the correction optical means, which shows a drive control means in the pitch direction. (The drive control means for the yaw direction has the same structure.)

In FIG. 16, current-voltage conversion amplifiers 732pa and 732pb convert photocurrents 731pa and 731pb occurring on the position detector 78p receiving light from the light emitter 76p into voltages, and a differential amplifier 733p earns a difference between the current-voltage conversion amplifiers 731pa and 731pb (an output proportional to the position in the pitch direction 725p of the support frame 72). These current-voltage conversion amplifiers 732pa, 732pb and differential amplifier 733p correspond to the amplification circuit 727p of FIG. 15.

A command amplifier 734p adds a command signal 730p to an output from the differential amplifier 733p and outputs the result to a drive amplifier 735p. The drive circuit 729p is composed of the drive amplifier 735p, transistors 736pa, 736pb, and a resistor 737p.

Resistors 738p, 739p and a capacitor 740p compose a well known phase lead circuit, which corresponds to the compensation circuit 728p.

A summing amplifier 741p receives a sum of outputs from the current-voltage conversion amplifiers 732pa, 732pb (a sum of receiving light quantities of the position detector 78p) and supplies it to an emitter drive amplifier 742p.

The light emitter 76p changes its emitting light quantity on a very unstable basis depending upon the temperature or the like, and the sensitivity of position detection of the differential amplifier 733p changes depending thereon. However, the change in the sensitivity of position detection becomes smaller when the light emitter is driven by the sum of receiving light quantities of the position detector 78 as described above (or by the constant receiving quantity control for increasing the emitting light quantity of the light emitter 76p as the sum of receiving light quantities becomes smaller).

An engagement means 61 for engagement of the support frame 72 is next explained referring to FIGS. 17A, 17B, 17C and FIGS. 14A and 14B.

The engagement means 61 is composed of the mechanical rocking chassis 718, plunger 719, spring 720, mechanical rocking arm 721, and shaft screw 722 as explained with FIGS. 14A and 14B. FIGS. 17A and 17B show views of the engagement means 61 when observed along the directions of arrows 718a, 718b in FIG. 14A, and FIG. 17C shows a cross section of the plunger 719.

In FIG. 17C the plunger 719 is composed of a slider 719a, a stator 719b, and, a coil 719c and a permanent magnet 719d mounted in the stator 719b. As shown in FIG. 17A, the slider 71a is hooked on a hole 721b of the mechanical rocking arm 721 rotatably supported by the shaft screw 722, and the mechanical rocking arm 721 is rotationally energized in the direction of arrow 720a by the spring 720. Because of this arrangement, the slider 719a is always subject to such drawing force $F_{OUT}$ as to draw it out of the stator 719b. However, because the slider 719a is in contact with the permanent magnet 719d, the attractive force is so great as not to move the slider by the force of spring 720 ($F_{mg}$>$F_{OUT}$ where $F_{mg}$ is the attractive force of the permanent magnet).

In this state a dowel 721a at the tip of the mechanical rocking arm 721 is fit in a hole 72d of the support frame 72, thereby stopping the support frame 72.

When an electric current then flows in a desired direction in the coil 719c, it changes a flow of magnetic flux of a magnetic circuit comprised of the permanent magnet 719d, the slider 719a, and the stator 719b, thereby weakening the attractive force between the slider 719a and the permanent magnet 719d. Then the force of spring 720 rotates the mechanical rocking arm 721 in the direction of arrow 720a, whereby the dowel 721a leaves the hole 72d, thereby releasing the engagement ($F_{OUT}$>$F_{mg}$−$F_i$ where $F_i$ is the repulsive force due to the current).

The slider 719a is also drawn out of the stator 719b on this occasion, and a gap δ appears between the slider 719a and the permanent magnet 719d.

Since the attractive force is inversely proportional to the square of the distance between the permanent magnet and an opposed object, as is well known, the attractive force becomes extremely smaller because of occurrence of the gap δ.

After the supply of current to the coil 719c is interrupted, the disengaged state of the support frame 72 is maintained by the urging force of the spring 720.

When the electric current is next supplied in the opposite direction to the coil 719c, a resultant force of the attractive force of the slider 719a by this current and the attractive force of the permanent magnet 719d becomes greater than the force of the spring 720 so as to draw the slider 719a into the stator 719b ($F_{mg}$+$F_i$>$F_{OUT}$).

Once the slider 719a starts being drawn into the stator 719b, a decrease in the gap δ accelerates to increase the attractive force of the permanent magnet, so that the slider 719a comes to contact the permanent magnet 719d whereby the dowel 721a comes to fit in the hole 72d again to engage with the support frame 72.

As explained above, a bistable structure is realized for holding each state by supplying the electric current to the plunger only upon engagement or upon engagement release, thereby achieving a compact and power-saving engagement means.

FIGS. 18A and 18B are block diagrams to show the scheme of the control system of a camera equipped with the conventional image blur prevention apparatus as described above, in which reference numeral 91 denotes a fluctuation detection means corresponding to the angular velocity meter 83p, 83y in FIG. 13, which is composed of a fluctuation detection sensor for detecting the angular velocity, such as a vibration gyro, and a sensor output calculation means for cutting dc components in an output from the fluctuation detection sensor and thereafter integrating the output to obtain an angular displacement.

An angular displacement signal from the fluctuation detection means 91 is input into a target value setting means 92. The target value setting means 92 is composed of a variable differential amplifier 92a and a sample-and-hold circuit (S/H) 92b, and two signals input to the variable differential amplifier are always equal because the sample-and-hold circuit 92b is always in sampling. Thus, the output from the sample-and-hold circuit 92b is zero. However, once the sample-and-hold circuit 92b switches to a hold state due to an output from a delay means 93 as described below, the variable differential amplifier starts continuously supplying outputs from zero of that time.

An amplification factor of the variable differential amplifier 92a is arranged as variable by an output from a means 94 for setting the sensitivity of image blur prevention (sensitivity setting means). The reason for the variable arrangement is as follows. A target value signal of the target value setting means 92 is a target value (command signal) for the correction means 910 to follow up. A correction amount of the image plane to a drive amount of the correction means (the sensitivity of image blur prevention) changes depending upon optical characteristics based on a focus change in zooming or in focusing. Therefore, the amplification factor is changed to compensate for the change in the sensitivity of image blur prevention. The sensitivity setting means 94 is thus arranged to receive focal length information upon zooming from a zoom information output means 95 and focal length information upon focusing based on distance measurement information of an exposure ready means 96, and to calculate the sensitivity of image blur prevention based on the information or to extract information on the sensitivity of image blur prevention preliminarily set based on the information, thereby changing the amplification factor of the variable differential amplifier 92a in the target value setting means 92.

The correction means 910 shown in FIG. 18B is one in the sense of the wide concept also including those other than the above correction optical means 85.

A correction drive means 97 is the control circuit shown in FIG. 15, to which the target value from the target value setting means 92 is input as a command signal 730p, 730y.

A correction start means 98 is a switch for controlling connection between the drive circuit 729p, 729y and the coil 79p, 79y in FIG. 15, in which a switch 98a is connected to a terminal 98c in a normal condition to short-circuit the both ends of each coil 79p, 79y and in which, when a signal from a logical product means 99 is input, the switch 98a is connected to a terminal 98b to turn the correction means 910 into a control state (in which fluctuation correction is not carried out yet, but the power is supplied to the coil 79p, 79y to stabilize the correction means at the position where the signal from the position detector 78p, 78y is nearly zero). Further, the signal from the logical product means 99 is also supplied to the engagement means 914 on this occasion, whereby the engagement means 914 releases the engagement with the correction means 910.

The correction means 910 supplies the position signal from the position detector 78p, 78y to the correction drive means 97 to effect the position control as described above.

The logical product means 99 is arranged so that an AND gate 99a supplies an output when it receives both an on signal of switch SW1 operating in synchronization with half depression of a shutter release button of a release means 911 and a signal from an image blur prevention switch means 912. Namely, when a photographer actuates the image blur prevention switch of the image blur prevention switch means 912 and when the switch SW1 as the release means is turned on, the correction means is released from engagement into a control state.

The on signal of SW1 from the release means 911 is also supplied to the exposure ready means 96, which performs photometry, distance measurement, and lens in-focus driving and which outputs the focal length information upon focusing to the sensitivity setting means 94 as discussed above.

The delay means 93 receives the signal from the logical product means 99 and outputs it, for example, one second later, thereby making the target value setting means 92 output the target value signal, as described above.

The on signal of SW1 from the release means 911 is also input to the fluctuation detection means 91 to start the fluctuation detection means. As described previously, the sensor output calculation means including a large-time-constant circuit such as an integrator needs a certain time between start and stabilization of output.

The delay means 93 plays a role of outputting the target value signal to the correction means after waiting before the output from the fluctuation detection means becomes stabilized, and starts image blur prevention after the output from the fluctuation detection means becomes stabilized.

Receiving an on signal of switch SW2 operating in synchronization with full depression of the shutter release button of the release means 911, the exposure means 913 moves a mirror up, opens and closes the shutter at the shutter speed obtained based on the photometric value of the exposure ready means 96 to effect exposure, and then moves the mirror down to complete photographing.

When after photographing the photographer frees the release button of the release means 911 to turn SW1 off, the logical product means 99 stops its output to change the sample-and-hold circuit 92b of the target value setting means 92 into a sampling state, thereby changing the output from the variable differential amplifier 92a to zero.

Thus, the correction means 910 returns to the control state in which the correction drive is stopped.

When the output from the logical product means 99 becomes off, the engagement means 914 engages with the correction means 910, and thereafter the switch 98a of the correction start means 98 is connected to the terminal 98c so as to bring the correction means 910 out of the control state.

The camera with the conventional image blur prevention apparatus as described above had the following problems to be solved.

As explained with FIGS. 18A and 18B, the operation of the image blur prevention apparatus is effected in such a manner that the image blur prevention switch means 912 as a main switch of image blur prevention is turned on to supply the power to the circuits in the image blur prevention apparatus, the fluctuation detection means is started by half depression of the shutter release button of the release means 911 (by the on signal of SW1), and then image blur prevention is started after the time delay of $t_1$.

Some types of recent cameras have a real time m(de (which is a mode of short release time lag in which exposure is started within a very short time after the switch SW2 synchronized with full depression of the release button is turned on), and such types of cameras are often demanded to have a rapid photographing property.

Even among a cameras not having the real time mode, some models are particularly preferred by users desiring a rapid photographing property for the reasons including the relatively small release time lag, the quick shutter speed, etc.

There appear the following problems as inconveniences in use when the lens barrel with the conventional image blur prevention apparatus is mounted on such a camera.

(1) It is necessary to start exposure after the image blur prevention apparatus becomes accurately effective with a lapse of the time $t_1$ in the half-depression state of the release button (while SW1 is kept on), which causes the problem that the waiting time $t_1$ is troublesome when rapid photographing is preferred. If exposure were started without a lapse of time $t_1$, image degradation due to hand fluctuation would not be avoided.

(2) Generally, rapid photographing is necessary in sports photographing or the like, and frequent framing changes are necessary in such cases. When the image blur prevention is effective in that case, the image blur prevention apparatus also corrects even the framing changes, resulting in the problem that the framing changes are not allowed.

Generally, a photographer frequently repeats half depression of the shutter release button (this operation also effects focusing and photometry in the case of an automatic focusing camera) as aiming the camera at an object, though it is also the case with normal cameras (those not needing the rapid photographing property). This is for correcting deviations of focus and photometry value due to the framing change. However, this has resulted in the problem that the photographer must wait a time $t_1$ every framing change with the camera having the above image blur prevention apparatus, which is burdensome.

(3) A switch for controlling the image blur prevention apparatus is mounted on the lens barrel including the correction optical means. When the control switch for image blur prevention is mounted on the lens barrel side in this manner, the switch could be often left on, which could cause the following problem. Namely, supposing the lens barrel with the image blur prevention function is taken away from the camera after photographing with the control switch for image blur prevention left on, then a lens barrel without the image blur prevention apparatus is mounted on the camera to continuously take some photographs, and thereafter the lens barrel with the image blur prevention function is again mounted on the same camera. Image blur prevention is started even though the photographer does not intend to effect image blur prevention. This has resulted in the problem that a framing change is not possible.

Especially, if the above control switch for image blur prevention also serves as an engagement interlocking mechanism of the correction optical means and when the lens barrel is taken off from the camera as leaving the switch on, the correction optical means is kept in a disengaged state, and thus, the correction optical means fluctuates while the photographer carries the lens barrel. This would result in unfavorable touching or damaging of the lens barrel. When the lens barrel is again mounted on the camera body to start photographing, the correction optical means is not controlled at all and is in the disengaged state before half depression of the release button. Then the correction center of the correction optical means would not be coincident with the optical-axis center of the lens in many cases. In such cases, when the correction optical means came to be controlled by half depression of the release button so as to make the image blur prevention effective, there occurred the problem that framing was deviated from that before start of image blur prevention.

(4) In the prior-art case as described above, the time constant of the sensor output calculation circuit is changed in order to quickly stabilize the fluctuation correction target output, immediately after start of the fluctuation detection means. This change of the time constant is a known technique. When an extremely small time constant is changed into a large time constant convenient for image blur prevention in order to quickly stabilize the fluctuation correction target output (when a change amount of the time constant is set greater), it can quickly remove low-frequency errors (hereinafter referred to as bias errors) close to the dc bias components overlaid on the fluctuation detection means, but components close to frequencies of hand fluctuation can rarely be removed. Thus, for example when image blur prevention with high accuracy is carried out as in long-time exposure, a certain waiting time is necessary before this error (hereinafter referred to as a phase error) stops.

On the contrary, when a certain time constant not so small was changed into a large time constant (when a change amount of the time constant was set smaller), there was the problem that a certain time was necessary for removing the bias errors while the phase error described above was able to be quickly removed.

SUMMARY OF THE INVENTION

One aspect of the invention is an image blur prevention device operating for image blur prevention, an apparatus adapted thereto, an optical device, or a camera, which comprises a control device for changing in accordance with a first operation the image blur prevention device into a predetermined state at a time when a predetermined time has elapsed from the first operation, the control device regulating a change of the image blur prevention device into the predetermined state in accordance with execution of a second operation before the predetermined time has elapsed from the first operation.

Another aspect of the invention is that an operation portion for operating the image blur prevention apparatus, a determination device for determining the camera to which the image blur prevention apparatus is attached, and a control device for changing a response to the operation portion of the image blur prevention apparatus in accordance with the determination of said determination device are provided. Thereby, the operation of the image blur prevention apparatus corresponding to the operation portion is changed in accordance with a state of the attachment of the image blur prevention apparatus.

BRIEF DESCRIPTION OF THE DRAWINGS

FIGS. 1A and 1B are perspective views for explaining the schematic structure of a part of the camera in the first and fourth embodiments of the present invention;

FIGS. 4A and 4B are drawings for explaining the schematic structure of a part of the camera in the second and third embodiments of the present invention;

FIGS. 9A and 9B are drawings for explaining the schematic structure of a part of the camera in the fifth embodiment of the present invention;

FIGS. 14A and 14B are exploded, perspective views to show the major part of the conventional lens barrel equipped with the correction means included in the image blur prevention apparatus shown in FIG. 13;

DETAILED DESCRIPTION OF THE PREFERRED EMBODIMENTS

The embodiments of the present invention will be explained by reference to FIG. 1A to FIG. 12C.
<Embodiment 1>

The first embodiment of the present invention will be explained referring to FIG. 1A to FIG. 3C.

Figure 2B:
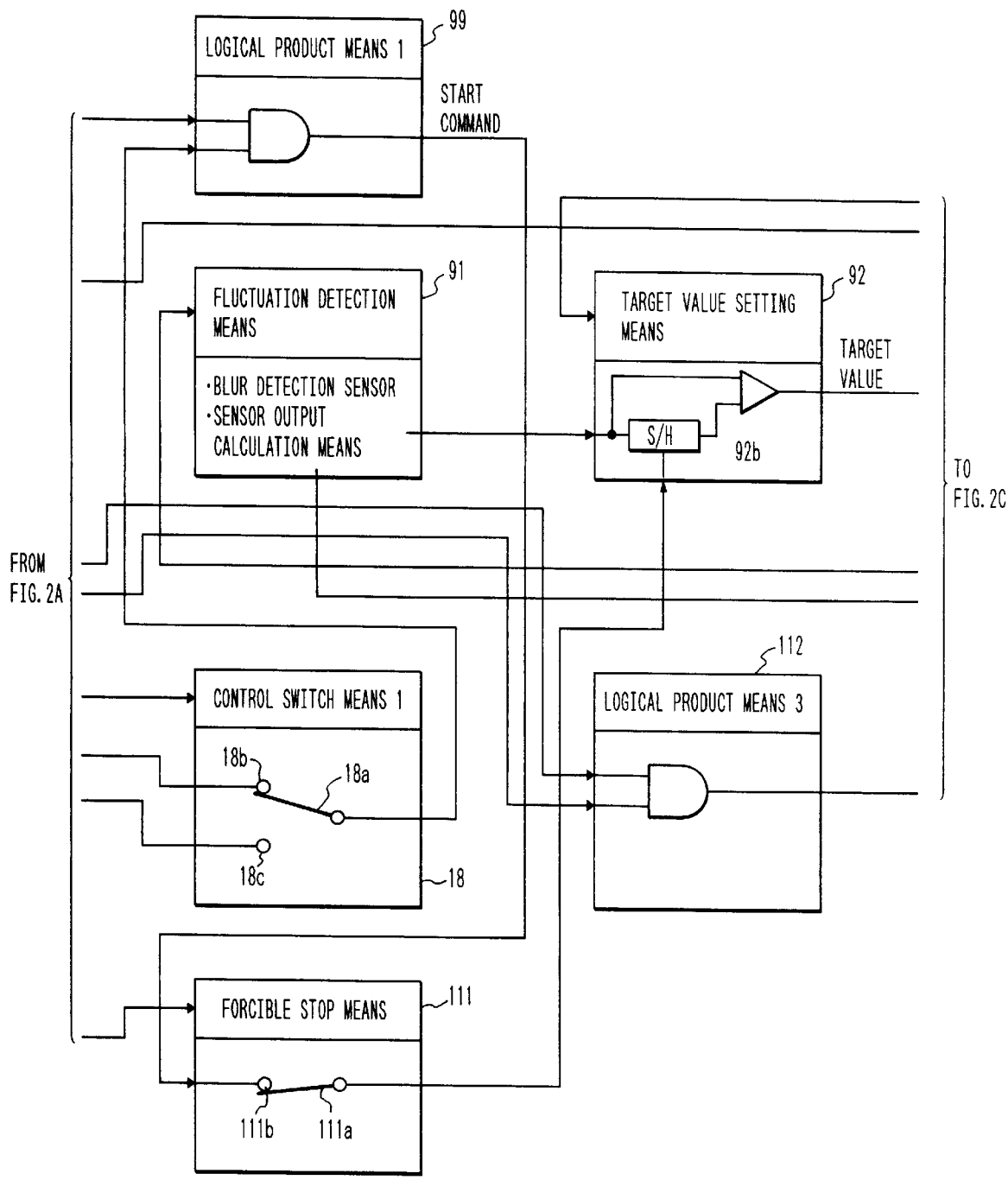
FIG. 2 which is composed of FIGS. 2A to 2C are block diagrams for explaining control operations between components mounted in the camera of FIGS. 1A and 1B and functions of the camera.

FIG. 1A is a drawing to show the appearance of the camera of the present embodiment and FIGS. 2A to 2C are block diagrams to show the functions of the camera and the control system of the image blur prevention apparatus.

In FIGS. 1A and 1B, a lens microcomputer 16 in the lens barrel 82 mounted on a camera body 11 executes determination of a type of the camera body 11 and determination of a photographing mode from a contact 12 with the camera body 11. Further, a signal of a switch 17 by a photographer switch knob 17a given on the lens barrel 82 is also input into the lens microcomputer 16. The lens microcomputer 16 serves as a control means for changing control modes of three switches 912, 14, 911 as described below.

Reference numeral 912a denotes a slide switch (a knob for image blur prevention switch means), and the switch 912 is turned on or off in accordance with an operation of the photographer to control image blur prevention. Numeral 13a is a shutter release button, mounted in the camera body 11, which is interlocked with the switches SW1 and SW2 as described below. The switch 911 (release means) is turned on or off in accordance with a depressing operation of the release button so as to perform sequential operations of camera and control of image blur prevention. A recoiling push switch knob 14a is arranged so that, when it is pushed, patterns 14b, 14c become short-circuited by a conductor 14c to turn the switch on (start control means).

A rod 912b provided on the slide switch 912a is fit in a hole 85a of the correction optical means 85 whereby the correction optical means 85 is normally engaged so as not to move; but it is released from the engagement when the slide switch 912a is slid in the direction of arrow a in order to make the image blur prevention on.

A connecting rod 15 is urged toward the camera body 11 (to the image plane) by a spring 15c. When the lens barrel 82 is mounted on the camera body 11, an end portion 15a of the connecting rod 15 projecting from the lens barrel before mounting is pushed by the camera body so as to move the connecting rod 15 toward the head of the lens barrel (to the object side) against the spring force of the spring 15c. When the lens barrel 82 is next taken away from the camera body 11, the connecting rod 15 is moved toward the camera body by the spring force of the spring 15c whereby an arm 15b pushes the slide switch 912a in the opposite direction to the arrow a to turn the switch 912 off (or reset the switch) and to fit the rod 912b in the hole 85a to engage with the correction optical means 85. Namely, even if the lens barrel 82 is taken away from the camera body 11 with the slide switch 912a left on after photographing with effecting image blur prevention, the switch 912 is turned off at that point (that is, the control switch for image blur prevention is reset) and the correction optical means 85 is engaged, which improves safety when the lens barrel 82 is carried alone and which can prevent the image blur prevention from unintentionally starting when the release button 13a is half depressed (SW1 on) with the lens barrel 82 being next mounted on the camera body 11.

The control of the image blur prevention apparatus is next explained using the block diagrams of FIGS. 2A to 2C.

Figure 18B:
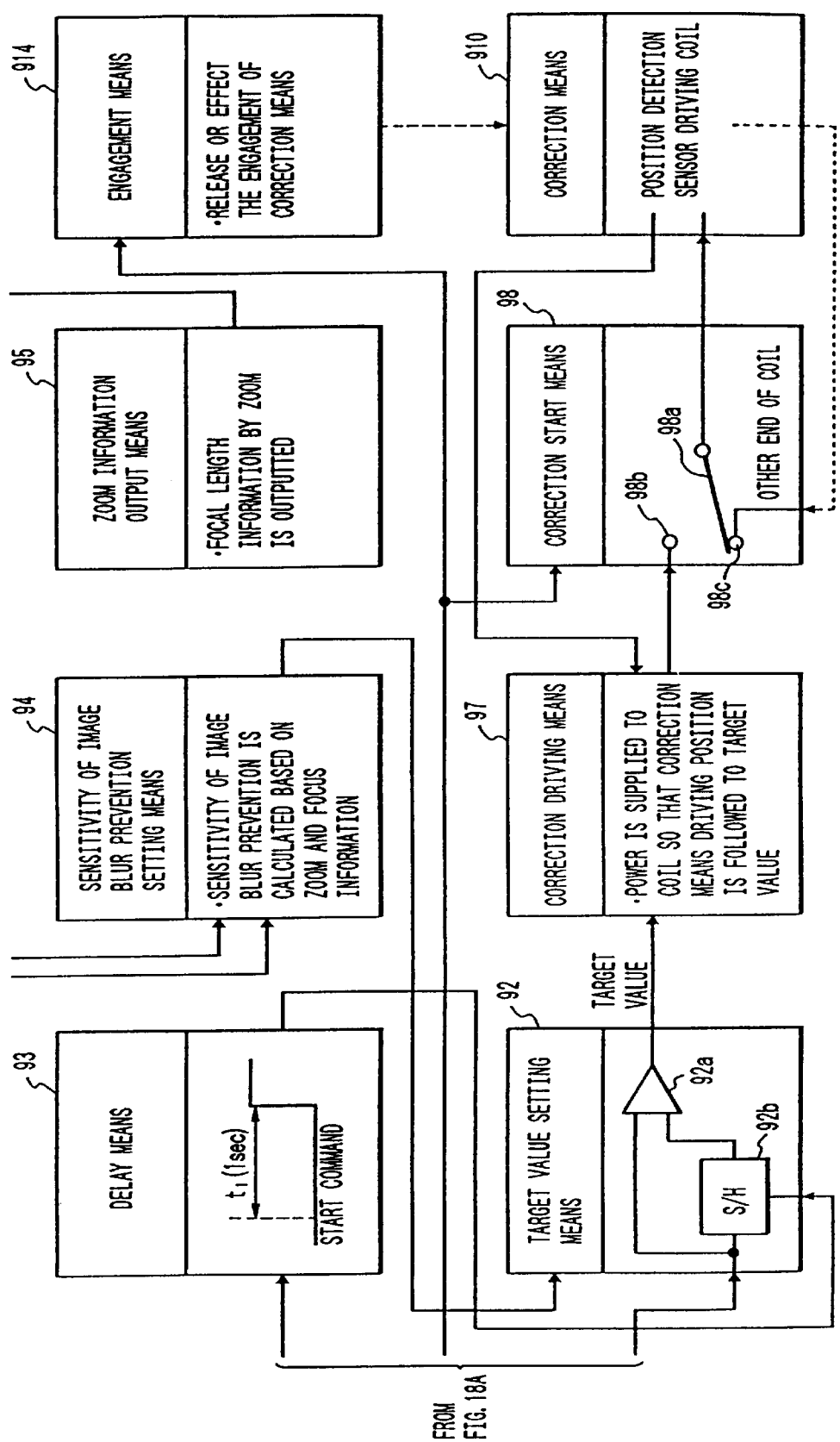
FIG. 18 which is composed of FIGS. 18A and 18B are block diagrams for explaining the functions and control operations of the camera equipped with the lens barrel having the image blur prevention apparatus in the structure shown in FIG. 14A to FIG. 17C.

In FIGS. 2A to 2C the blocks having the same functions as those in FIGS. 18A and 18B are denoted by the same reference numerals and the description thereof is omitted.

In FIGS. 2A to 2C, a body type determination means 16 comprised of the lens microcomputer supplies an output in the case of a real time (RT) camera, when the real time mode is selected, in the case of a camera of a type with which the rapid photographing property is preferred, or when the photographer operates the slide switch 17a to turn the switch 17 on, so as to connect the switch 18a of the control switch means 1 (18) to the terminal 18c (the switch 18a is connected to the terminal 18b under normal conditions).

Then an output from a logical product means 2 (19) and a signal output by switch-on of SW1 of the release means 911 make the logical product means 1 (99) output, thereby turning the target value setting means 92 into a start condition. The signal of SW1 of the release means 911 is arranged to be output while the release means 911 is kept half depressed and not to be output when the half depression is released.

The logical product means 2 (19) gives an output with input of both the signal from the image blur prevention switch means 912 and the signal from the start control means 14.

A switch 110a of a control switch means 2 (110) is normally connected with a terminal 10b, but this connection is interrupted with an output from the body type determination means 16.

A switch 111a of a forcible stop means 111 is normally connected with a terminal 111b, but this connection is interrupted with an output from the start control means 14, which prevents the signal from the logical product means 1 (99) from being transferred to the circuit 92b in the target value setting means 92, thereby disabling correction drive of the correction means 910. However, when the control switch means 2 (110) is disconnected (with the output from the body type discrimination means 16), the forcible stop means 111 works so as to maintain the connection between the switch 111a and the terminal 111b even with the output from the start control means 14.

A logical product means 3 (112) supplies an output with input of both the on signal of SW1 from the release means 911 and the signal from the image blur prevention switch means 912 to start the fluctuation detection means 91 through a timer means 2 (113). The fluctuation detection means 91 is set so as to be kept in an operation state when the signal from the timer means 2 (113) is output.

The timer means 2 is arranged to start outputting a signal in accordance with a change from a state where the signal from the logical product means 3 is not input into a state where the signal is input, to continue the output of signal for t seconds (for example, 30 seconds) after the change of the signal from the input state into the non-input state, and to stop the output after the lapse of t seconds. For example the fluctuation detection means 91 starts operating when the image blur prevention switch means 912 is on and when SW1 is on, and it continues driving for t seconds after SW1 is turned off or after the image blur prevention switch means 912 is turned off and stops driving after the lapse of t seconds. This means that the fluctuation detection means 91 is in a signal output state while SW1 is on and during the period of t seconds after SW1 is turned off.

A start detection means 114 is arranged to control whether a sensor start operation of the fluctuation detection means 91 as described below should be performed when the shutter release button is half depressed. The start detection means is arranged to stop the output only when both signals from the logical product means 3 (112) and the timer means 1 (115) are output. Since the timer means 1 (115) is arranged to maintain the output state only during the period of t seconds after SW1 of the release means is turned off, as shown, the start detection means 114 stops its output only when the release means 911 is half depressed during the period of t seconds after switch-off of SW1 of the release means to output the signal from the logical product means 3 (112).

On the other hand, when the output from the timer means 2 (113) is started in accordance with the half depression operation of release means in the output state of the start detection means 114, the fluctuation detection means 91 executes the sensor start operation in which the time constant of the sensor output calculation means is set to a small value in synchronization with the start of the fluctuation detection means 91 and, after a lapse of a predetermined time (for example, one second), the time constant is changed from the small value to a large value.

When the output from the timer means 2 (113) is started in accordance with the half depression operation of release means while the start detection means 114 does not output, the sensor start operation as described above is not carried out. Namely, the sensor start operation is carried out when the release means 911 is half depressed (when SW1 is turned on) to start image blur correction in a non-operation condition of the fluctuation detection means 91; but the sensor start operation is not carried out when the release means 911 is again half depressed (when SW1 is again turned on) or when the image blur prevention switch means 912 is turned on while the fluctuation detection means 91 is continuously driven before a lapse of t seconds from release of half depression of the release means 911 (from off operation of SW1) or from off operation of the image blur prevention switch means 912 (the sensor start operation is unnecessary because the fluctuation detection means 91 is in an operation state).

Figure 3A:
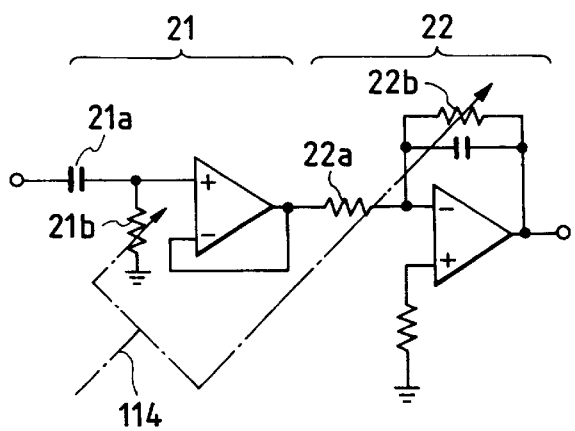
FIG. 3A is a drawing for explaining an example of an arithmetic circuit included in the fluctuation detection means 91 shown in FIG. 2B and a function of start detection means 114 of FIG. 2C, and FIGS. 3B and 3C are drawings for explaining characteristics of the arithmetic circuit and the function of the start detection means 114.
Figure 3B:
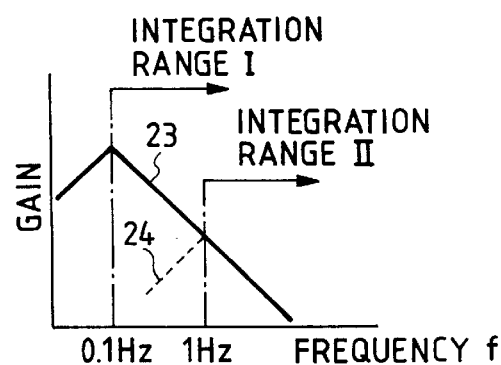

The above sensor start operation is explained in more detail in the following. A simplified form of the sensor output calculation means is composed of a high-pass filter 21 and an integration circuit 22, as shown in FIG. 3A, which has the frequency characteristics shown by the solid line 23 in FIG. 3B upon image blur prevention (where the angular velocity signal of fluctuation from the fluctuation detection sensor is attenuated below 0.1 Hz while it is integrated above 0.1 Hz) but is set to have the characteristics shown by the dashed line 24 in FIG. 3B (where the signal is attenuated below 1 Hz but is integrated above 1 Hz) by decreasing resistances of resistors 21b, 22b at the initial stage of start of the fluctuation detection means (when the start detection means 114 gives an output and when the fluctuation detection means 91 is started) and thereafter to increase the resistances of the resistors 21b, 22b during the above predetermined period (one second) up to predetermined resistances for the frequency characteristics shown by the solid line 23 in FIG. 3B. This is the sensor start operation.

With the characteristics of the dashed line 24 the DC bias error components overlapping in the fluctuation detection sensor are removed within a short time period (for example, the dc bias errors are removed within one second in the case of the characteristics for attenuating the signal below 1 Hz, whereas ten seconds are necessary in the case of the characteristics for attenuating the signal below 0.1 Hz), and thereafter the characteristics are changed to the arithmetic characteristics suitable for the image blur prevention shown by the solid line 23, thereby realizing early stabilization of output from the fluctuation detection means.

Figure 3C:
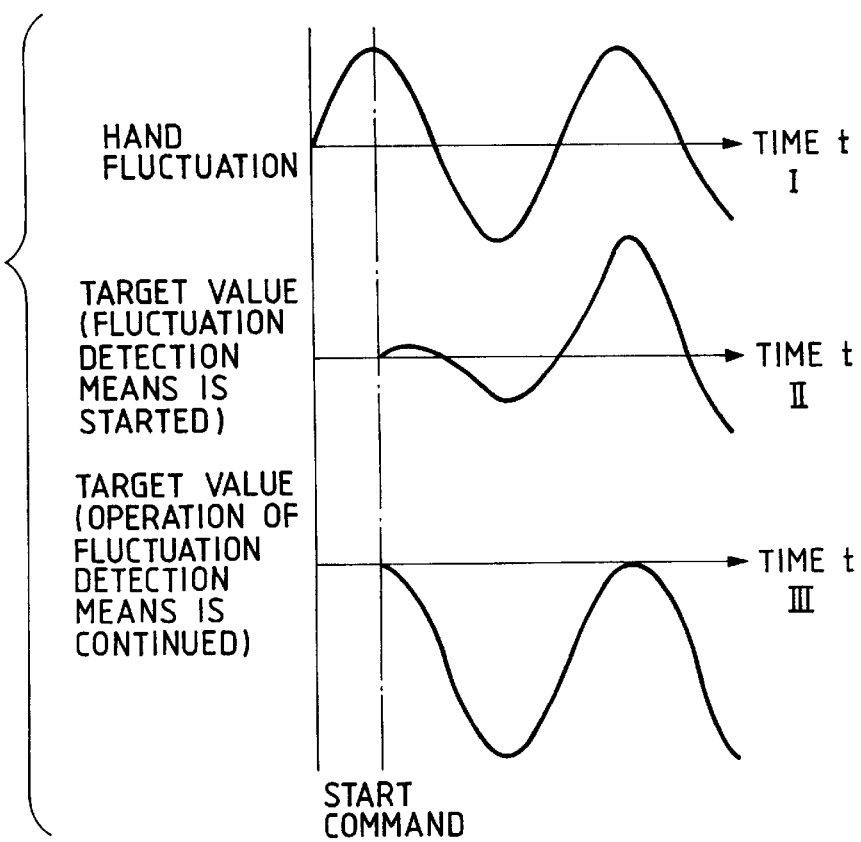

States of the output from the fluctuation detection means 91 in this case are explained using FIG. 3C.

Against actual hand fluctuation shown by I in FIG. 3C, the output II from the target value setting means 92 starts gradually outputting to become an appropriate hand fluctuation target value as the sample-and-hold circuit 92b is in hold from the start of the fluctuation detection means. In other words, the image blur prevention is fade-in image blur prevention in which image blur prevention becomes gradually effective.

With input of both the signal from the logical product means 3 (112) and the signal from the timer means 115 the start detection means 114 is in a non-outputting state, as described above, but the timer means 2 (113) continues outputting the signal for t seconds from output off of the logical product means 3 (112). During this period the fluctuation detection means 91 continues driving based on the operation of the timer means 2 (113).

The non-outputting chance of the start detection means 114 is limited to only a case where the fluctuation detection means has been driving heretofore, then SW1 is turned off (or the image blur prevention switch means is turned off) to stop the image blur prevention, and the SW1 is again turned on (or the image blur prevention switch means is turned on) within the period of t seconds.

Since the fluctuation detection means 91 is in a driving state by the operation of the timer means 2 (113) at this time and the output thereof is stable, there is no need to switch the time constant. Accordingly, the characteristics of the sensor output calculation circuit are fixed at the solid line 23 in that case, and the output from the target value setting means 92 starts outputting the signal from zero at the time of start command (at the hold of the sample-and-hold circuit 92b) as shown by III in FIG. 3C, thus immediately starting image blur prevention.

Namely, where SW1 is frequently operated, the first image blur prevention starts gradually becoming effective as fading in, and the second or subsequent image blur prevention is immediately started, thereby necessitating no waiting time. The timer means 2 (113) is arranged in such a manner that, after half depression of the release means, 911 is released and when the release means 911 is again half depressed before a lapse of t seconds therefrom, counting of the timer means is reset (this reset cancels stopping of the fluctuation detection means 91 in accordance with the mentioned release of half depression) to maintain the signal outputting state, and the mentioned counting is restarted from the time when half depression is again released.

The timer means 1 (115) is also arranged in such similar manner that counting is reset after half depression of the release means 911 is first released and when the release means 911 is again half depressed before a lapse of the period of t seconds therefrom and that counting is again started from the point when half depression is again released. The above embodiment is arranged so that the driving state of the fluctuation detection means 91 is maintained for t seconds after release of half depression of the release means 911, but it may be modified in such a manner that the drive of the fluctuation detection means 91 is first stopped in accordance with release of half depression, then is restarted, and thereafter is stopped at the time when the period of t seconds has elapsed from the release of half depression.

Next explained is the image blur prevention operation in actual photographing in the above configuration.

A. In the case of normal cameras

The body type determination means 16 does not output so as to connect the switch 18a of the control switch means 1 (18) to the terminal 18b and also to connect the switch 110a of the control switch means 2 (110) to the terminal 10b.

If image blur prevention photographing is not desired, the image blur prevention switch means 912 is kept off so as to keep the logical product means 1 (99), the logical product means 2 (19), and the logical product means 3 (112) outputting no signal. Thus, the fluctuation detection means 91 is not started to maintain the output from the target value setting means at zero (because the sample-and-hold circuit 92b is in a sampling state), and the correction start means 98 is also off so as not to effect image blur prevention. Further, the correction means 910 is in an engaged state because the image blur prevention switch means 912 is not operated. Therefore, photographing is performed based on the normal sequence as well known sequence when the release means 911 is operated.

For image blur prevention photographing, the image blur prevention switch means 912 is turned on to release engagement of the correction means 910 and to turn the correction start means 98 on, thereby turning the correction means 910 into a control state.

Since the fluctuation detection means 91 is not started at this point yet, the correction means 91 is stabilized at an electrically neutral point, and the image blur prevention drive is not effected.

With operation of SW1 the logical product means 3 (112) provides an output to start the fluctuation detection means 91 with intervention of the timer means 2 (113) and change the time constant of the sensor output calculation means from the small value to the large value, and at the same time, the logical product means 1 (99) provides an output to switch the sample-and-hold circuit 92b from the sample state to the hold state and to change the target value setting means 92 from the zero output state to a state in which a signal is output in accordance with a detection output from the fluctuation detection means 91, whereby the correction means 910 gradually starts image blur prevention (because the image blur prevention target value gradually changes the output to the appropriate value by the change of the time constant).

The configuration of FIGS. 2A to 2C is arranged so that the sensor start operation (where the time constant of the sensor output calculation circuit is changed from the small value to the large value for the predetermined time) is started in synchronization with execution of the operation of half depression of the release and the sample-and-hold circuit 92b is switched from the sample state to the hold state, but it may be modified in such a manner that a delay circuit or the like is set between the logical product means 1 (99) and the target value setting means 92 and the sample-and-hold circuit 92b is switched from the sample state to the hold state after completion of the sensor start operation as described above or during the sensor start operation. The same can be applied to the embodiments that follow.

When on and off operations of SW1 are continuously repeated as described above and if intervals thereof are within the time t (for example, 30 seconds), the image blur prevention is started at the same time as the on operation of SW1 upon the second or subsequent on operation of SW 1.

When the push switch knob 14a of FIGS. 1A and 1B is depressed in this effective state of image blur prevention, the start control means 14 provides an output to interrupt the connection of the switch 111a of the forcible stop means 111 and return the sample-and-hold circuit 92b of the target value setting means 92 to the sample state. Then the target value output from the target value setting means 92 becomes zero to stop the image blur prevention as the correction means 910 is stabilized at the neutral point. Again releasing the push switch knob 14a, the sample-and-hold circuit 92b again turns into the hold state and the target value setting means 92 again starts continuously outputting the target value from zero, as shown in III of FIG. 3C.

Namely, the push switch knob 14a is used if the photographer desires to momentarily stop the image blur prevention, and this arrangement has the following merits in use.

In the use of the lens barrel with the conventional image blur prevention apparatus, the photographer will have the following desire and dissatisfaction while viewing the object through the finder.

(1) The photographer will desire to lock the focus in order to check different compositions by finely changing framing, but the photographer will be dissatisfied, because fine framing changes are not possible due to effective image blur prevention.

(2) The photographer will desire to know actual fluctuation of the photographer himself through the finder upon image blur prevention, that is, to check the effect of image blur prevention.

A camera having the configuration of the present embodiment can solve the above problems.

Namely, the photographer pushes the push switch knob 14a on such occasions to momentarily stop the image blur prevention, thereby performing the above framing changes or checking of the image blur prevention effect.

Also, while the center of the correction optical means is shifting greatly from the center of the optical axis because of great hand fluctuation, the push switch knob 14a is pushed to return the correction optical means to the center and the push switch knob 14a is again released, whereby the correction optical means starts the image blur prevention from the center.

The present embodiment thus has such merit in that the photographer can arbitrarily perform centering of the correction means. After the composition is determined, the release button 13a is fully depressed (SW2 is turned on), thereby performing photographing with the image blur prevention effect.

B. In the Case of RT Camera

The body type determination means 16 gives the output to connect the switch 18a of the control switch means 1 (18) to the terminal 18c and to interrupt the connection of the switch 110a of the control switch means 2 (110) with the terminal 110b.

When image blur prevention photographing is not performed, the image blur prevention switch means 912 is kept off, and then photographing is carried out based on the same sequence well known, in normal cameras.

For image blur prevention photographing, the image blur prevention switch means 912 is turned on to release the engagement of the correction means 910 and to turn the correction start means 98 on, thereby turning the correction means into the control state. Since the fluctuation detection means is not yet started at this point, the correction means 910 is stabilized at the electrically neutral point, and the image blur prevention drive is not carried out. Here, with an operation of SW1 the logical product means 3 (112) provides an output to start the fluctuation detection means with intervention of the timer means 2 (113) and to change the time constant of the sensor output calculation circuit from the small value to the large value. The operation up to this point is the same as in the case of a normal camera. In the case of the normal camera the correction means starts driving at this point to make the image blur prevention gradually effective, whereas in the case of the RT camera the image blur prevention is not yet carried out at this point and only the output from the fluctuation detection means comes to be stabilized by switch of the time constant.

With the operation of SW1 the camera has already finished focusing and the photographer is waiting for a shutter chance as performing framing work.

When the photographer pushes the push switch knob 14a in photographing, the logical product means 2 (19) provides an output (because the image blur prevention switch means 912 is already in an outputting state), the logical product means 1 (99) also provides an output (because the signal of SW1 is also already output) with intervention of the control switch means 1 (18), the sample-and-hold circuit 92b turns to the hold state with intervention of the forcible stop means 111 (the connection of the forcible stop means 111 will never be interrupted because the connection of the control switch means 2 (110) is interrupted), and the target value signal is output to start the image blur prevention. At this time the image blur prevention is immediately started because the output of the fluctuation detection means is already stabilized. If SW1 and push switch knob 14a are simultaneously depressed, the image blur prevention comes to be gradually effective because of a switch of the time constant.

When the photographer desires to momentarily stop the image blur prevention, the photographer releases the push switch knob 14a, which stops the image blur prevention. When the photographer again pushes the push switch knob 14a, the image blur prevention is immediately restarted. In other words, the role of the push switch knob 14a in the normal camera is reversed in the RT camera.

Further, the photographer's freeing the release button 13a interlocked with SW1 also stops the logical product means 1 (99) from outputting the signal so as to stop the image blur prevention, and the image blur prevention can be immediately effected if an interval before the photographer again depresses the release button 13a is within the time t, which is the same as in the normal camera.

Photographing is made with an on signal of SW2 of the release means 911.

As explained above, the control modes of the switches provided on the lens side are changed depending upon the type of the camera employed, and the changes are summarized below Table 1.

TABLE 1

Changes of control modes of lens switches (No. 1)

| Type of camera | Start of fluctuation detection means | Start of image blur prevention | Temporary stop of image blur prevention |
|---|---|---|---|
| normal camera | switch 912a (first switch means): on; and SW1 (second switch means): on | → | push switch knob 14a (third switch means): on; or SW1 (second switch means): off |
| RT camera | switch 912a (first switch means): on; and SW1 (second switch means): on | push switch knob 14a (third switch means): on | push switch knob 14a (third switch means): off or SW1 (second switch means): off |

In the case of the RT camera required to have the rapid photographing property as described above, the image blur prevention is not carried out with an on signal of SW1 (for photometry, distance measurement, and focusing). For preparation for photographing, the photographer, aiming at the object, pushes the push switch knob 14a at a shutter chance to effect the image blur prevention, and photographing becomes possible as immediately starting the image blur prevention, thus permitting the photographer to freely perform framing work or focus lock; in the case of the normal camera the image blur prevention is carried out at the same time as the on operation of SW1, which can avoid complex operation.

The first embodiment is also improved in the following points as compared with the image blur prevention apparatus available heretofore, and is thus improved in operability.

(1) Since the push switch knob 14a (the third switch means) composing the start control means 14 is a recoiling switch, the operation including temporary stop of image blur prevention is easy and can avoid increasing hand fluctuation due to this switch operation.

(2) After the fluctuation detection means is initially started, once the drive is continued for a while even with an off signal of SW1 (a part of the image blur prevention apparatus continuously functions for the predetermined time even if the image blur prevention is off). Thus, there is no waiting time when SW1 is next operated to effect image blur prevention without a long interval, which is convenient when SW1 is frequently operated (for example, when focusing is repeated). (The initial characteristics of the image blur prevention apparatus are changed between the first operation of SW1 and the second or subsequent operation.)

(3) Since stability of the fluctuation detection means can be easily determined by whether the fluctuation detection means was already started or not when SW1 is turned on (by whether the power is supplied or not), circuit loads can be decreased.

(4) The time constant of the fluctuation detection means is subjected to the change control only at the first on operation of SW1, but is not at and after the second on operation.

(5) Since the correction means is already at the electrically stable point (or controlled) before start of the image blur prevention operation, the drive for image blur prevention can be performed immediately with start of image blur prevention.

(6) Since the switch for controlling the correction means also serves as the engagement member of the correction means, the configuration is simplified.

(7) Since the fluctuation detection means can be preliminarily started before image blur prevention (in the RT mode), the image blur prevention can be immediately effected at an arbitrary time. (There is the ready means for preliminarily starting a part of the image blur prevention apparatus: the ready means is composed of the image blur prevention switch means 912 and SW1 of the release means 911.)

(8) Since the switch for image blur prevention is reset when the lens barrel is removed from the camera body (the switch provided on the lens side is reset when the lens barrel is removed from the camera), it can prevent the switch from being left on.

(9) The engagement means of the correction optical means operating in synchronization with the image blur prevention switch engages the correction optical means when the lens barrel is removed from the camera body.

<Embodiment 2>

The second embodiment of the present invention is shown in FIGS. 4A and 4B and FIGS. 5A to 5C. The second embodiment is different from the first embodiment in the control modes of the switches of the lens barrel, the engagement type of the correction means, the method for determining switch of the time constant of the fluctuation detection means, and the method for switching the time constant. The description will be omitted for the same functions as those in FIGS. 1A and 1B and FIGS. 2A to 2C.

In FIGS. 4A and 4B, the correction optical means 85 is engaged with the connecting rod 15, and the engagement is released when the lens barrel 82 is mounted on the camera body 11. Namely, the operation of the slide switch 912a is made irrelevant to the engagement of the correction optical means 85.

Figures 5, 5A:
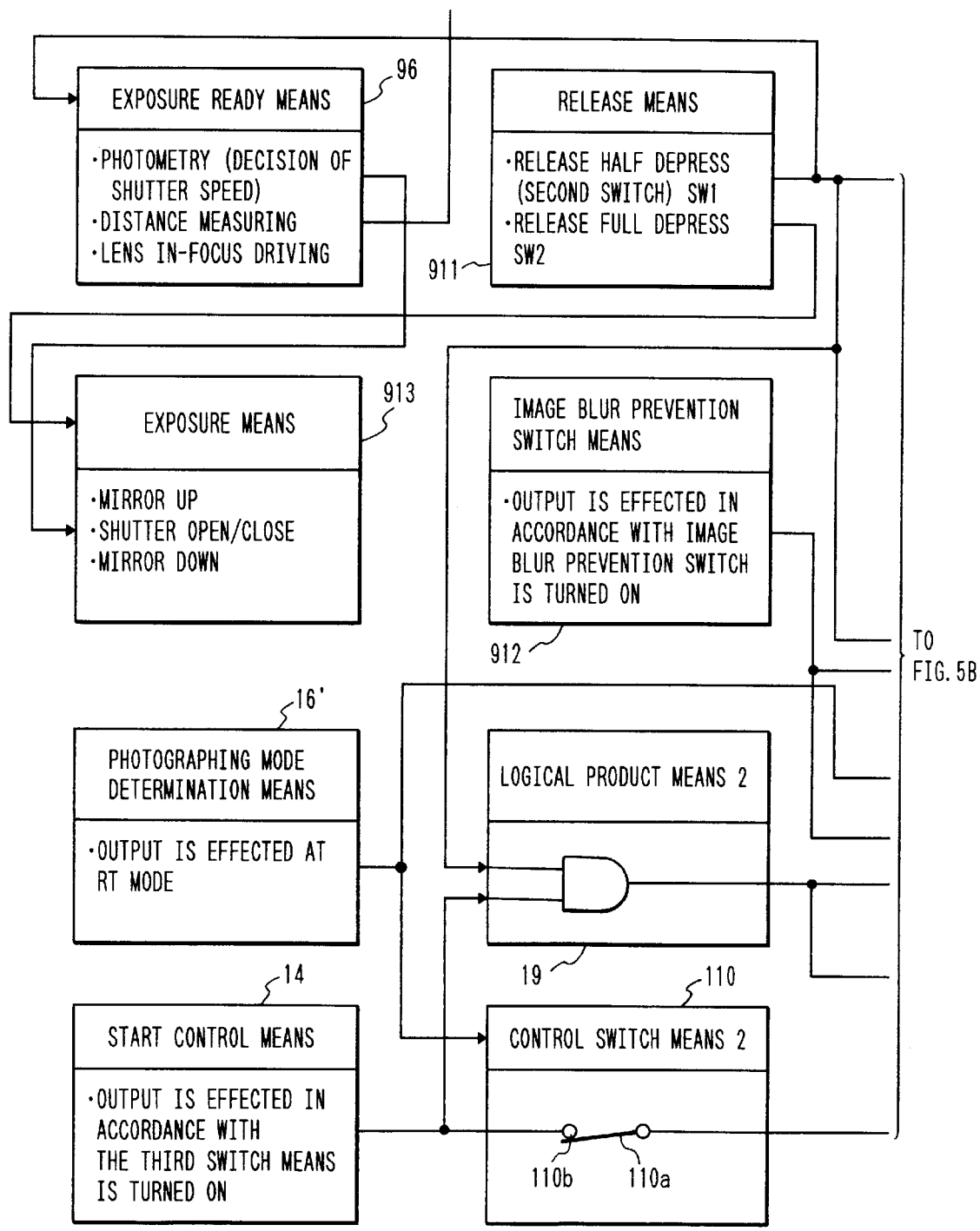
FIG. 5 which is composed of FIGS. 5A to 5C are block diagrams for explaining control operations between components mounted in the camera of FIGS. 4A and 4B and functions of the camera.

Regardless of whether the image blur prevention is effected or not by the operation of SW1 of the release means 911 in FIG. 5A, the correction start means 98 is turned on whereby the correction means is stabilized at the electrically neutral point (to be turned into in the control state). In the first embodiment of FIGS. 2A to 2C the signal from the image blur prevention switch means 912 and the signal from the start switch means 14 are input to the two inputs of the logical product means 2 (19), whereas in the configuration of FIGS. 5A to 5C the signal of SW1 of the release means 911 and the signal from the start switch means 14 are input to the two inputs of the logical product means 2(19).

Further, the output from the logical product means 2 (19) is also input to the timer means 1 (115) whereby the fluctuation detection means can be started.

Further, the present embodiment has a stabilization judgment means 32 started by an output from a logical product means 4 (31) (which is output when a second or subsequent operation of SW1 is performed within a shorter time than the time t from a previous operation of SW1) with reception of the outputting signal from the logical product means 3 (112) and the signal from the timer means 1 (115), and the signal from the fluctuation detection means 91 is input to the stabilization judgment means 32. The stabilization judgment means 32 judges a degree of stabilization of the output and indicates a change amount of the time constant of the fluctuation detection means.

Figure 5B:
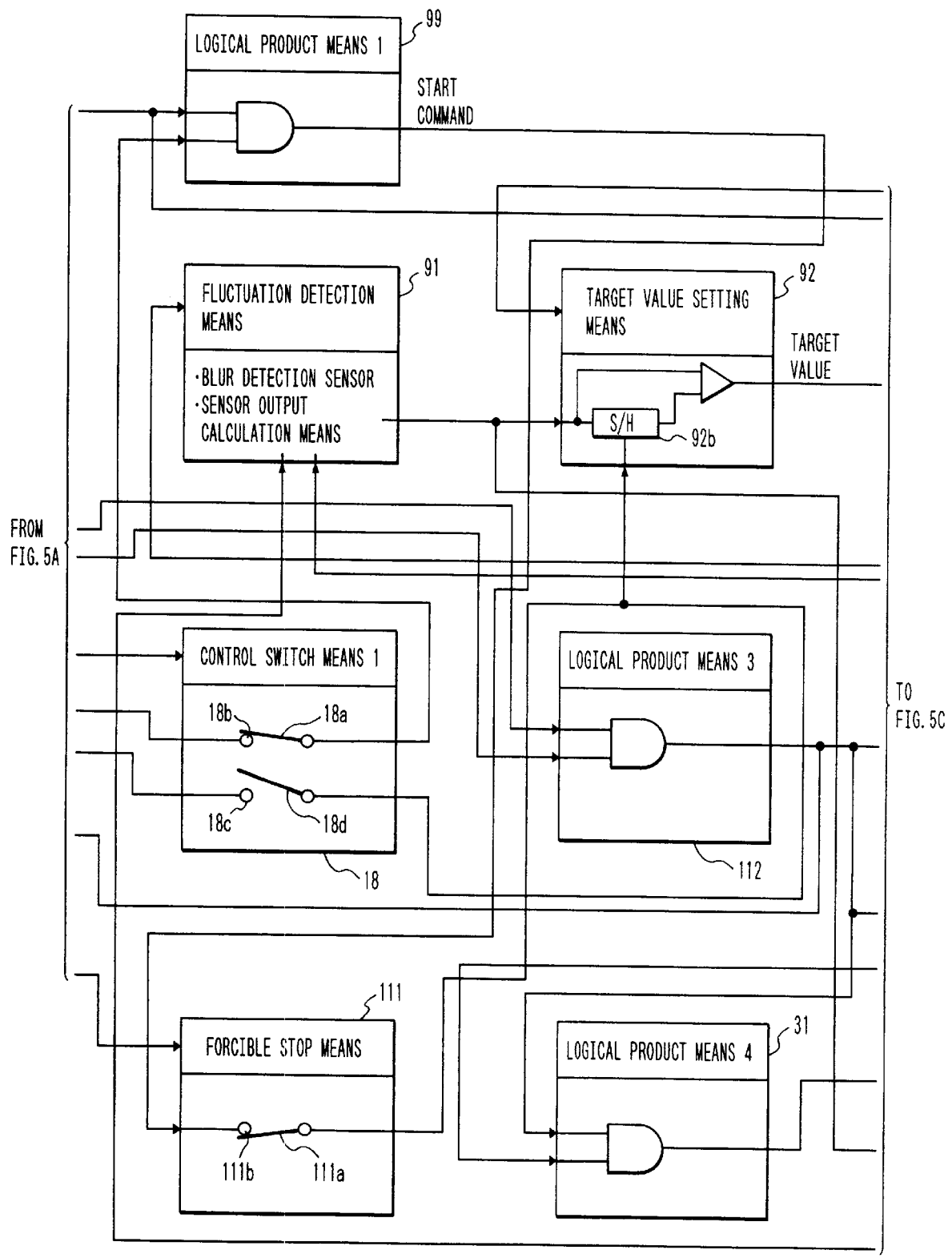
Figure 5C:
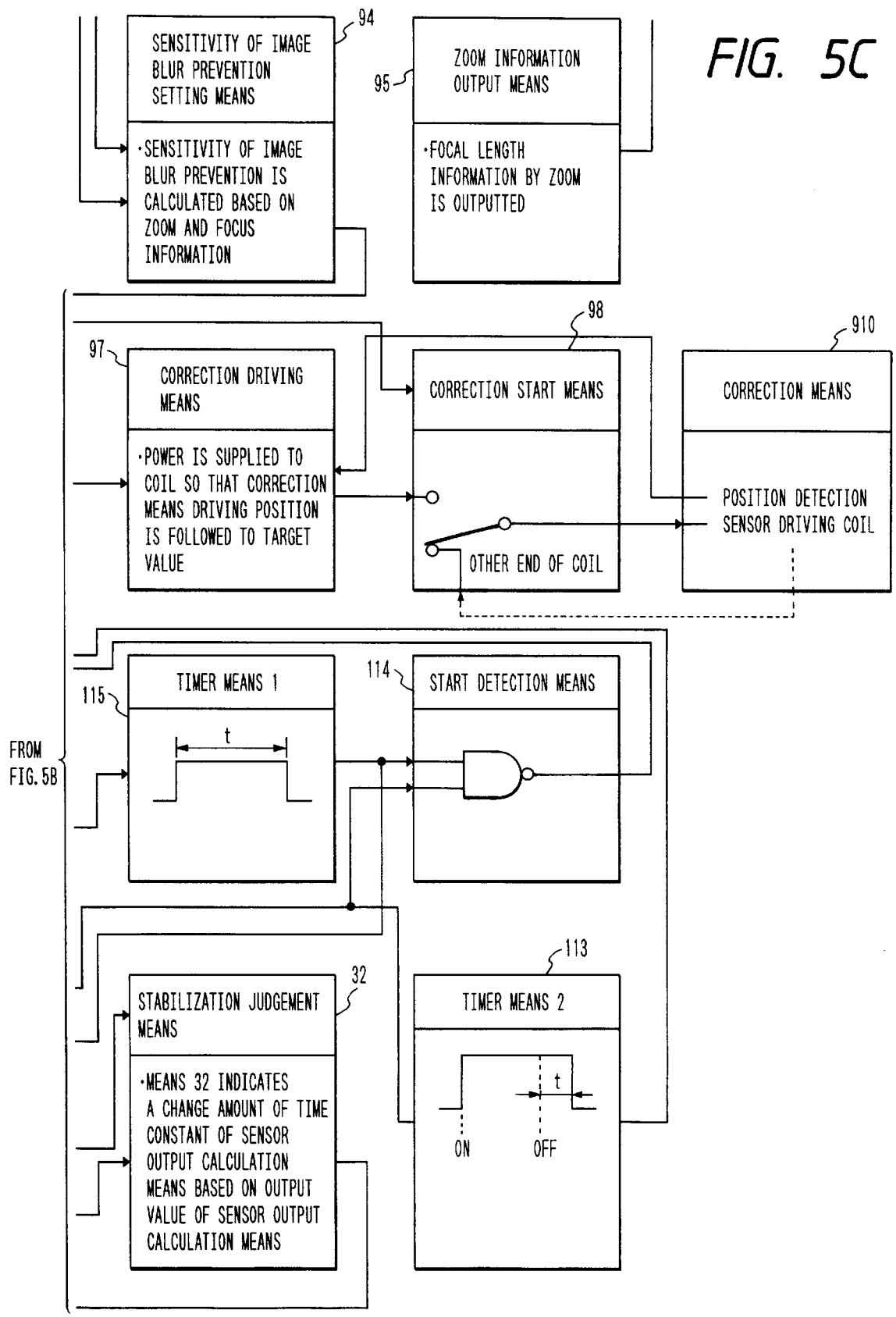

Similarly as in FIGS. 2A to 2C, the time constant of the fluctuation detection means is unconditionally set at the small value upon the first on operation of SW1 by the start control means 14, and thereafter the time constant is changed from the small value to the large value to stabilize the output. At the second or subsequent on operation of SW1 within t seconds from off of SW1, the time constant is not changed in FIGS. 2A to 2C, whereas the configuration of FIGS. 5A to 5C is different in that whether the time constant should be changed or not is judged depending upon stabilization of output and the change amount is controlled based thereon.

As described above, if the second or subsequent on operation of SW1 is within the time t, the logical product means 4 (31) provides an output to start the stabilization judgment means 32 and to check stabilization of the output from the fluctuation detection means. Although the output from the fluctuation detection means should be already yet stabilized at the second or subsequent on operation of SW1, the output is not yet stabilized for example, when the next on operation of SW1 is carried out during a still unstable state of the fluctuation detection means after the first on operation of SW1 was effected by depressing the shutter release button only for an extremely short time. Further, the output is not yet stabilized, when the release button is operated after a great framing change (panning or the like) after SW1 was first turned on.

In such cases the stabilization judgment means 32 provides an output to change the time constant of the fluctuation detection means, thereby stabilizing the output soon.

Figure 6A:
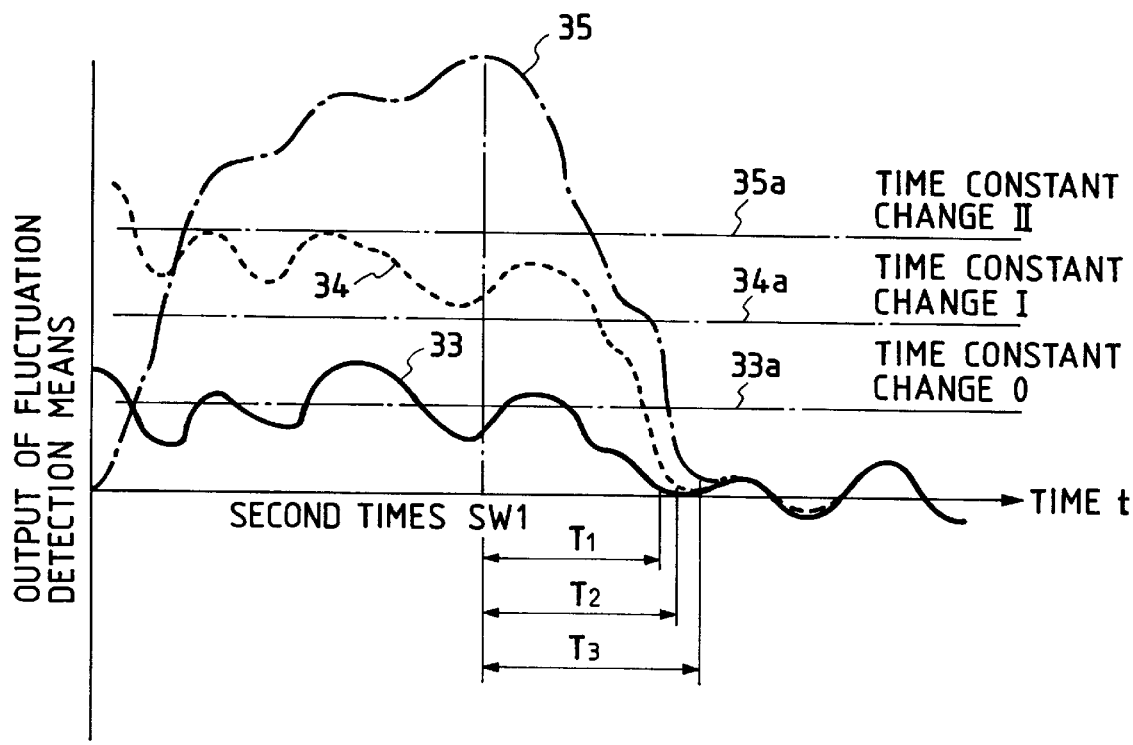
FIGS. 6A and 6B are drawings for explaining changes of characteristics of the fluctuation detection means 91 of FIGS. 4A and 4B.

FIG. 6A illustrates the above control modes, in which, when the output from the fluctuation detection means is almost stabilized as shown by the solid line 33 (when the signal is not above the level 33a at the second on of SW1), the change of the time constant is not carried out (the output is completely stabilized for the time $T_1$).

Figure 6B:
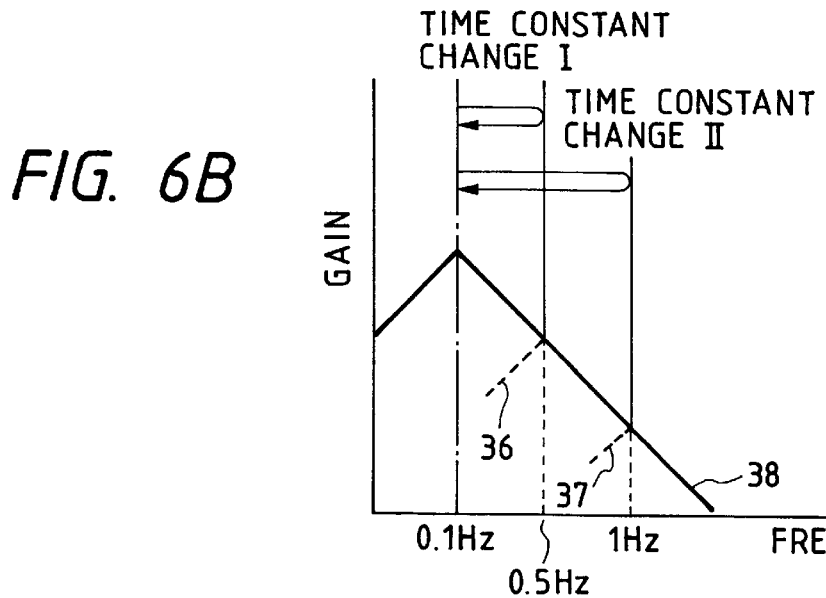

If the output is a little unstable as shown by the dashed line 34 (when the output is over the level 34a at the second on of SW1), the time constant is momentarily changed to a small value (time constant change I) from the characteristics of the solid line 38 shown in FIG. 6B to the characteristics (time constant) for attenuating the signal below 0.5 Hz but integrating the signal above it as shown by the dashed line 36, and then is gradually returned to the characteristics of the solid line 38 (the time constant is gradually increased) (so that the output is stabilized for the time of $T_2$). The time for stabilization naturally becomes longer as compared with the solid line 33, but the output is stabilized much faster than in the case without switch of time constant. The reason why the time constant is not changed into the characteristics for attenuating the signal below 1 Hz as at the first on of SW1 is that the degree of stabilization of the dashed line 34 is at the level that can be stabilized early enough by switching the time constant to the characteristics for attenuating the signal below 0.5 Hz and the time necessary for switch of time constant can be shortened by that degree and that the phase error can be converged earlier by setting the change amount of time constant smaller, as explained with the conventional example.

When the output is extremely unstable as shown by the chain line 35 (when the output is over the level 35a at the second on of SW1), the time constant is decreased from the characteristics of the solid line 38 to the characteristics of the dashed line 37 so as to be the same amount as the change amount of the time constant at the first on of SW1 (upon start of the fluctuation detection means) and the time constant is gradually increased again up to the characteristics of the solid line 38 (to be stabilized for $T_3$), whereby a large unstable amount can be stabilized early. (Of course, the phase error remains to the extent that the change amount of time constant is larger, and $T_2 < T_3$; however, the output is stabilized much faster than in the case without switch of time constant.)

Next explained returning to FIGS. 5A to 5C is the operation of image blur prevention along actual photographing.

(a) In the Case of the Normal Mode

When the image blur prevention is not used, the operation is the same as in the first embodiment except that the correction means is neutrally held (or is controlled) at the electrically stable point by the on operation of SW1.

When the image blur prevention is used, the correction means is controlled by the operation of the image blur prevention switch means 912 in the first embodiment, whereas the correction means is controlled by the on operation of SW1 in the second embodiment. Then the stability of the fluctuation detection means is also checked at the second or subsequent on operation of SW1 and the time constant is changed by a necessary amount on a necessary occasion. The other matters are the same as in the first embodiment.

(b) In the Case of the RT Mode

When the image blur prevention is not used, the operation is the same as in the normal mode.

When the image blur prevention is carried out, there is no need to operate the image blur prevention switch means 912 and upon the on operation of SW1 the push switch knob 14a is depressed to let the start control means 14 output. Since the photographing mode determination means 161 outputs the signal in the RT mode, the connection between the switch 18a and the terminal 18b in the control switch means 1 is interrupted, and the switch 18d is instead connected to the terminal 18c, whereby the signal output from the logical product means 2 (19) is input into the timer means 2 (113) to start the fluctuation detection means and the signal from the start detection means 114a changes the time constant of the fluctuation detection means. Further, the sample-and-hold circuit 92b is turned to the hold state to output the target value, thereby effecting image blur prevention. Namely, the operation can be switched between being in the mode effecting the image blur prevention and being in the mode not effecting the image blur prevention simply by turning the push switch 14a on or off and without a need to operate the image blur prevention switch means 912 as a slide switch. Even if the photographer suddenly desires to effect image blur prevention, the photographer can perform the operation while holding the camera.

Since at the second or subsequent operation of the push switch knob 14a determination of switch of time constant is carried out with the output from the fluctuation detection means, of course, image blur prevention can be effected immediately by the second or subsequent operation of the push switch knob 14a.

When the photographer desires to momentarily stop the image blur prevention, the photographer releases the push switch knob 14a or turns SW1 off, which is the same as in the first embodiment.

The control modes of the lens-side switches are changed depending upon the photographing mode of the camera in the second embodiment as described above, and the changes are summarized in Table 2.

TABLE 2

Changes of control modes of lens switches (No. 2)

| Photographing mode of camera | Start of fluctuation detection means | Start of image blur prevention | Temporary stop of image blur prevention |
|---|---|---|---|
| normal mode | switch 912a (first switch means): on; and SW1 (second switch means): on | → | push switch knob 14a (third switch means): on; or SW1 (second switch means): off |
| RT mode | SW1 (second switch means): on; and push switch knob 14a (third switch means): on | → | push switch knob 14a (third switch means): off or SW1 (second switch means): off |

The second embodiment is different also in the following points from the conventional image blur prevention apparatus and is thus improved in its functions.

(1) The time constant of the vibration detection means is unconditionally changed upon start of first image blur prevention, and at the start of the second or subsequent image blur prevention whether the time constant should be changed or not is determined depending upon the stability of the output from the fluctuation detection means, whereby the stability of the output from the fluctuation detection means can be enhanced upon start of the second or subsequent image blur prevention.

(2) Since the change amount of the time constant is made variable depending upon an unstable amount of the fluctuation detection means, the output can be stabilized at an early stage.

(3) The unstable output from the fluctuation detection means is stabilized by decreasing the time constant, and the time constant is again increased to achieve the characteristics suitable for image blur prevention, whereby stabilization of output can be attained with accuracy at an early stage.

It is needless to mention that the stabilization of output can be realized earlier by changing not only the time constant, but also Q (control amount), which is well known, upon switch (change) of the time constant.

<Embodiment 3>

Figure 7C:
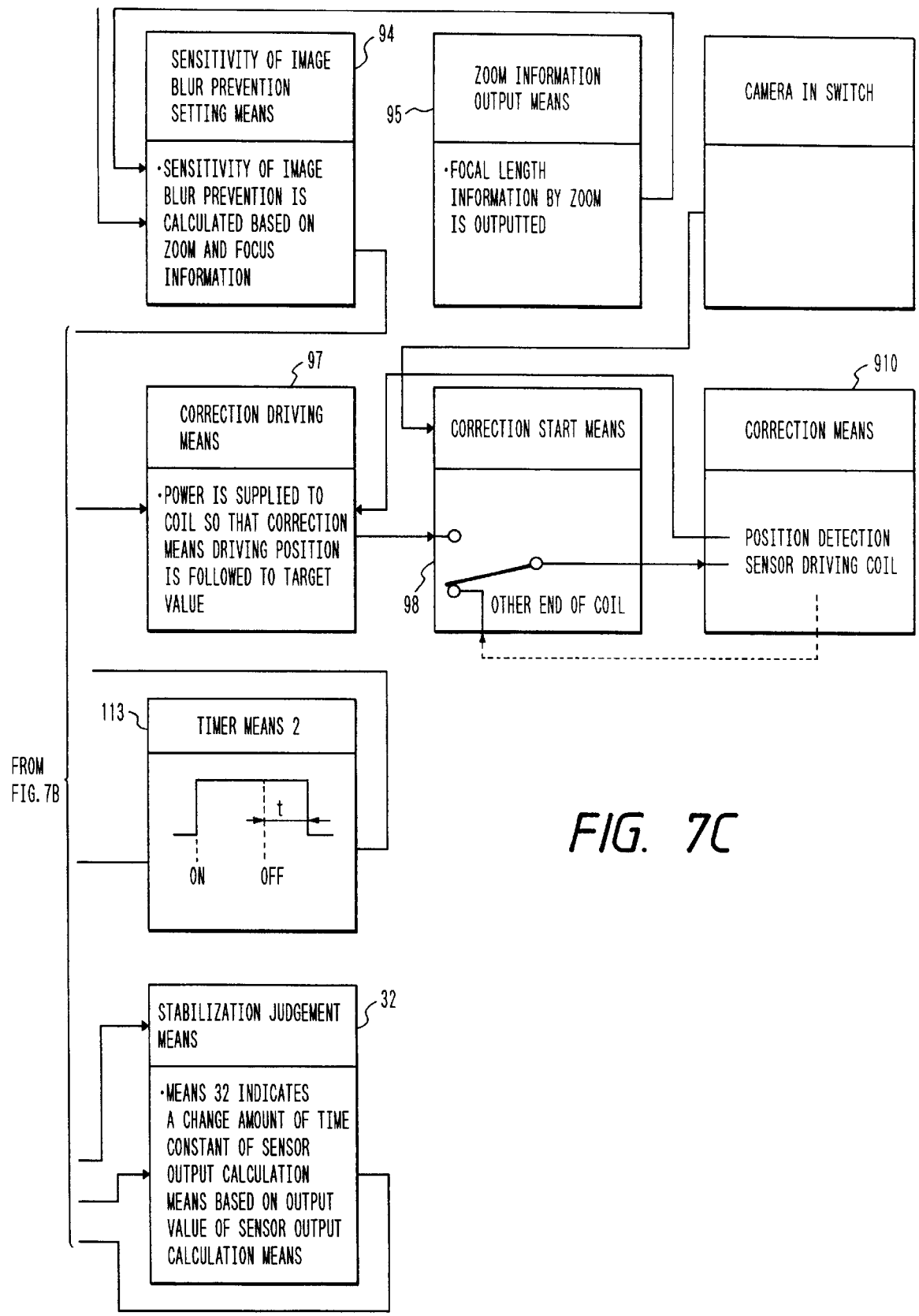
FIG. 7 which is composed of FIGS. 7A to 7C are block diagrams for explaining control operations between components mounted in the camera of the third embodiment of the present invention and functions of the camera.

The third embodiment of the present invention is shown in FIGS. 7A to 7C. The camera of the present embodiment has the same appearance as that of Embodiment 2 (FIGS. 4A and 4B) (thus a drawing to show the appearance is omitted) and is different from the second embodiment in that the correction means is held at the electrically neutral point when the correction start means 98 is turned on by a camera main switch 41 and in that the stabilization judgment means 32 is started by SW1 always to check the output from the fluctuation detection means.

Regardless of whether it is the first on of SW1 (or on of push switch knob 14*a*) or the second or subsequent on of SW1, the output from the fluctuation detection means is checked to instruct whether the time constant should be changed or not or to instruct a change amount thereof. Since at the second or subsequent on of SW1 the fluctuation detection means already continues drive, of course, the output is stable, and the image blur fluctuation immediately becomes effective without changing the time constant in most cases. Since the determination is carried out as to the stabilization of the output from the fluctuation detection means also upon first on of SW1, the determination takes a little time in some cases, (for example, where the fluctuation detecting means happens to be below a threshold level at the time of determination of stabilization, etc.), but the circuits can be greatly simplified as compared with the conventional example.

Further, because the correction means is also neutrally held by the camera main switch, the correction means is stable when the camera is shaken without depressing the release button.

<Embodiment 4>

Figure 8B:
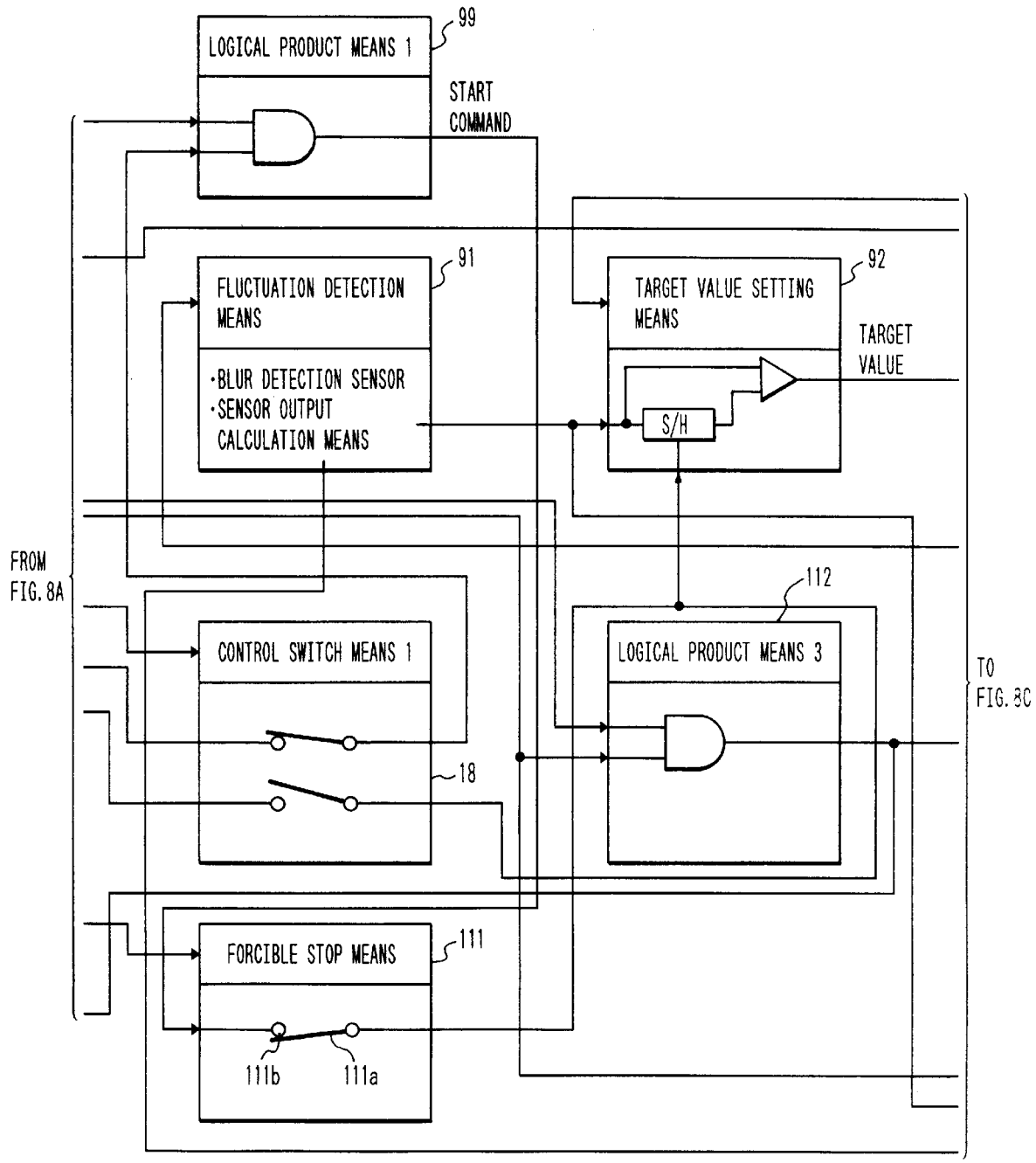
FIG. 8 which is composed of FIGS. 8A to 8C are block diagrams for explaining control operations between components mounted in the camera of the fourth embodiment of the present invention and functions of the camera.
Figure 8C:
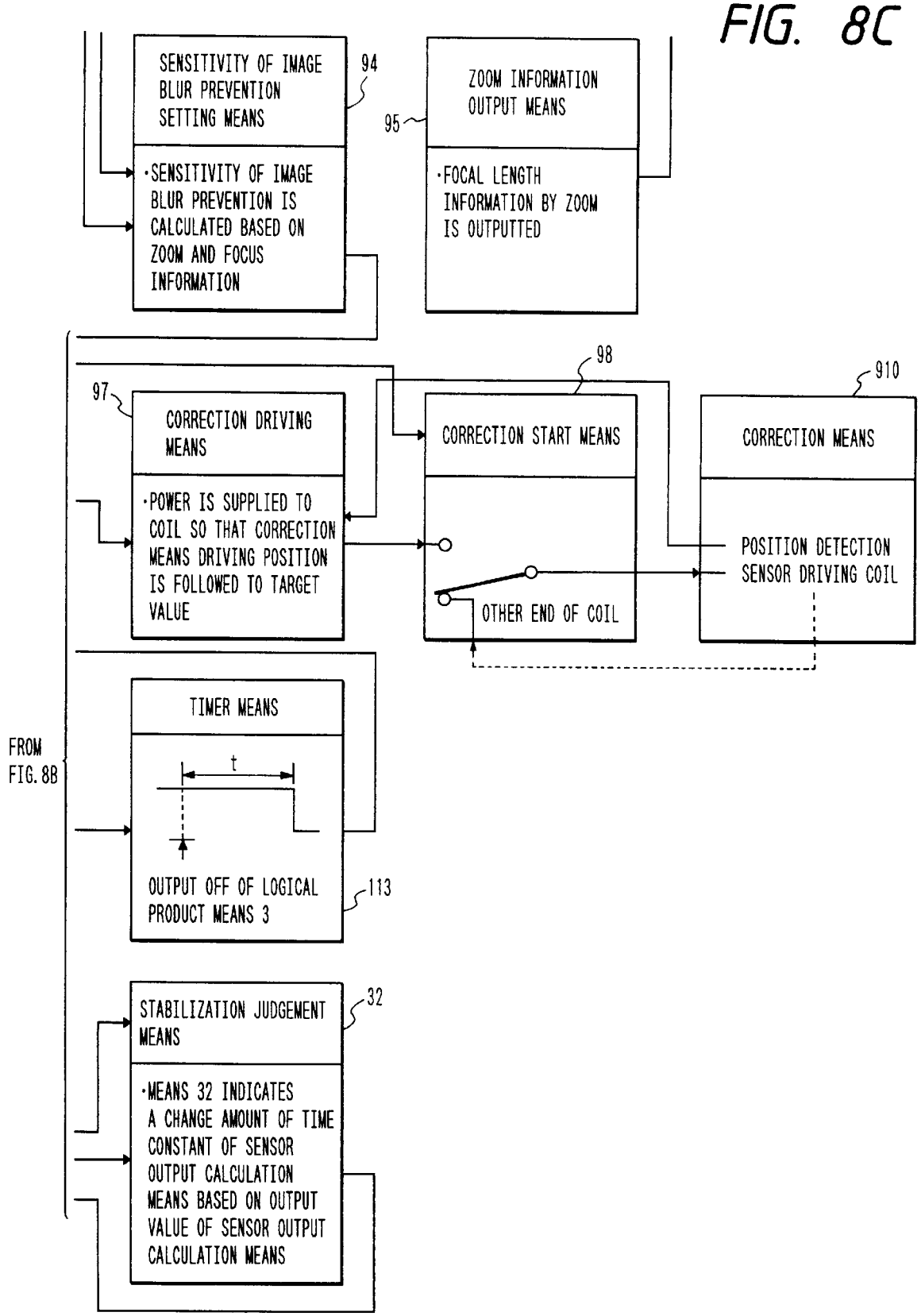

The fourth embodiment of the present invention is shown in FIGS. 8A to 8C. The stabilization judgment means 32 starts with the signal from the image blur prevention switch means 912 and the body type determination means 16''' gives the output, for example, when the lens barrel with the image blur prevention effect is mounted through an adaptor or the like to a camera body or a video camera with different mount (that is, when the lens barrel is mounted on the conventional camera body having no communication means with the image blur prevention lens barrel). The appearance is the same as that of the camera of FIGS. 1A and 1B, but the camera of the present embodiment is different from the camera of FIGS. 1A and 1B in that it has a logical product means 5 (51), the logical product means 5 (51) gives its output when receiving the signal from the image blur prevention switch means (912) and the signal from the body type determination means 16''', and the timer means 113 starts the fluctuation detection means 91 by the signal from the logical product means 5.

Namely, when the camera body has the communication means for image blur prevention, the image blur prevention switch means 912 is operated to start the fluctuation detection means at the time of the on operation of SW1; but, when the lens barrel is mounted on the camera body without the communication means for image blur prevention, the image blur prevention switch means 912 is operated to preliminarily start the fluctuation detection means 91 to operate the start control means 14, thereby getting ready for image blur prevention.

The control modes of the switches on the lens barrel side are changed depending upon the type of the camera body in the above fourth embodiment, and the changes are summarized in Table 3.

TABLE 3

Changes of control modes of lens switches (No. 3)

| Presence or absence of communication means for image blur prevention | Start of fluctuation detection means | Start of image blur prevention | Temporary stop of image blur prevention |
|---|---|---|---|
| camera body with communication means | switch 912a (first switch means): on; and SW1 (second Switch means): on | → | push switch knob 14a (third switch means): on; or SW1 (second switch means): off |
| camera body without communication means | switch 912a (first switch means): on | push switch knob 14a (third switch means): on | push switch knob 14a (third switch means): off |

As shown in above FIG. 2A to FIG. 8C and FIGS. 1A, 1B and FIGS. 4A, 4B, engagement of the correction optical means 85 is effected by the slide switch 912*a* for switch of image blur prevention or the engagement means mechanically interlocked with mounting to the camera body, but the engagement may be effected by an electromagnetic means as shown in FIG. 14A.

<Embodiment 5>

The fifth embodiment of the present invention is shown in FIGS. 9A and 9B and FIGS. 10A to 10C. The block arrangement of the whole control system (FIGS. 10A to 10C) is approximately the same as in FIGS. 8A to 8C, but, in the appearance as shown in FIGS. 9A and 9B, the slide switch 912*a* is a push switch, which is a switch for switching the image blur prevention on or off every depression of the switch, and a lamp 912*b* as a switch state displaying means is put on when the push switch 912*a* is depressed in order to use the image blur prevention.

Further, the present embodiment is provided with the engagement means 61 as explained with FIGS. 14A and 14B, which functions to release the engagement of the correction means with depression of the push switch 912*a* to effect image blur prevention and which establishes the engagement when the push switch is again depressed.

In FIGS. 9A and 9B and FIGS. 10A to 10C, the engagement means 61 electromagnetically releases the engagement of the correction means based on the operation of the image blur prevention switch means 912, as described previously, and at the same time, the correction start means 98 is turned on based on the operation of the image blur prevention switch means 912 to turn the correction means into the control state.

Further, a lens attach/detach determination means 62 produces its output based on the determination that the lens barrel is removed from the camera body, and the signal returns the correction means into the engaged state. The signal from the lens attach/detach determination means 62 (the signal indicating removal of lens) is also input into the image blur prevention switch means 912 to reset it from the on state of image blur prevention to the off state of image blur prevention. (The switch state displaying means 912b is put off.)

Here, a power supply state determination means 63 produces its output when the power supply is dissipated below a predetermined value. When the image blur prevention switch means is operated in order to use the image blur prevention in this state, the switch state displaying means 912b flashes to display a lack of the power supply.

Since the photographer looks at the switch state display means 912b always to check whether the switch operation is proper or not in operating the push switch 912a in order to use the image blur prevention, the arrangement of the present embodiment can surely inform the photographer of dissipation of the power supply upon this occasion.

<Embodiment 6>

Figure 10B:
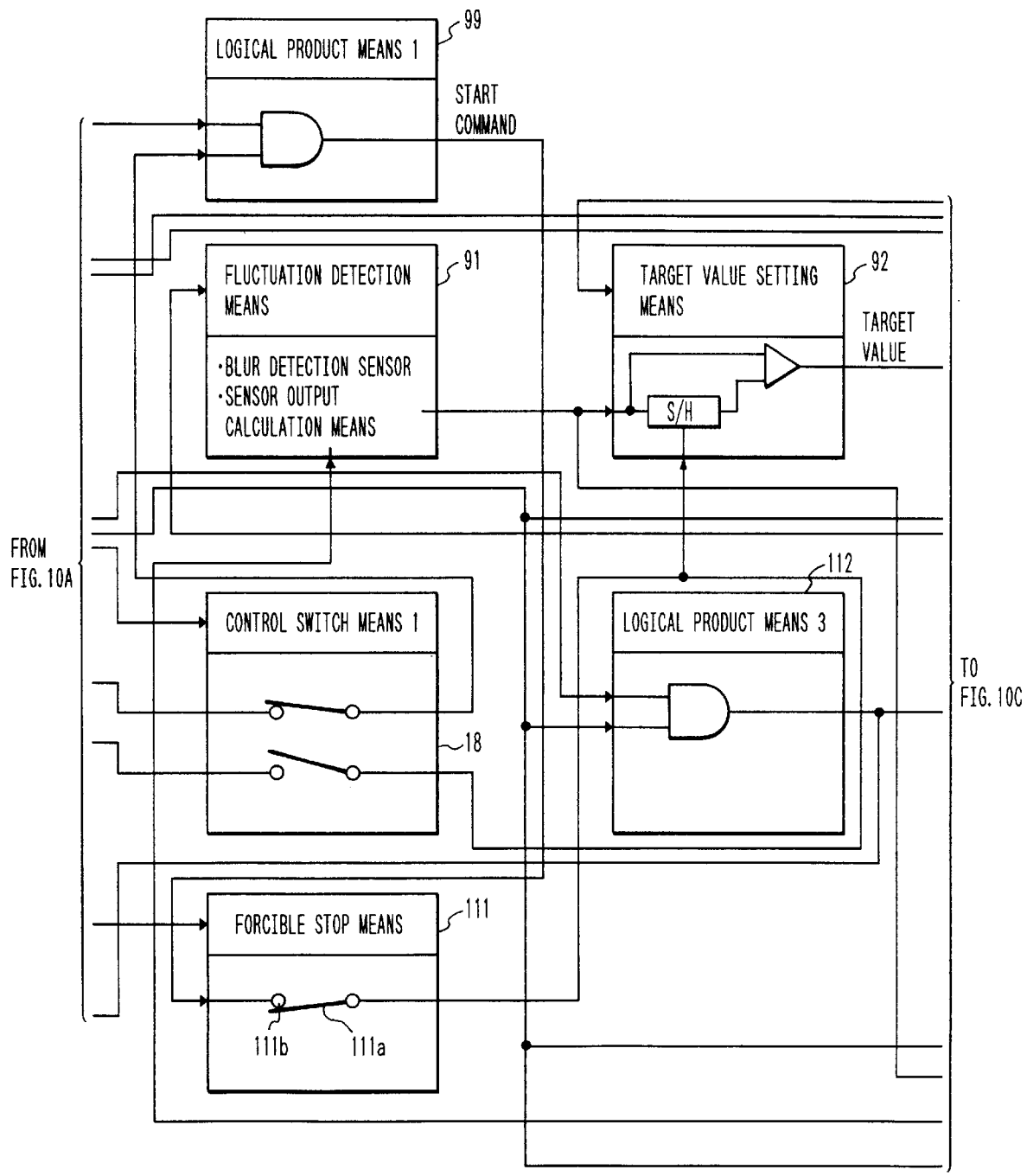
FIG. 10 which is composed of FIGS. 10A to 10C are block diagrams for explaining control operations between components mounted in the camera of the fifth embodiment of the present invention and functions of the camera.
Figure 10C:
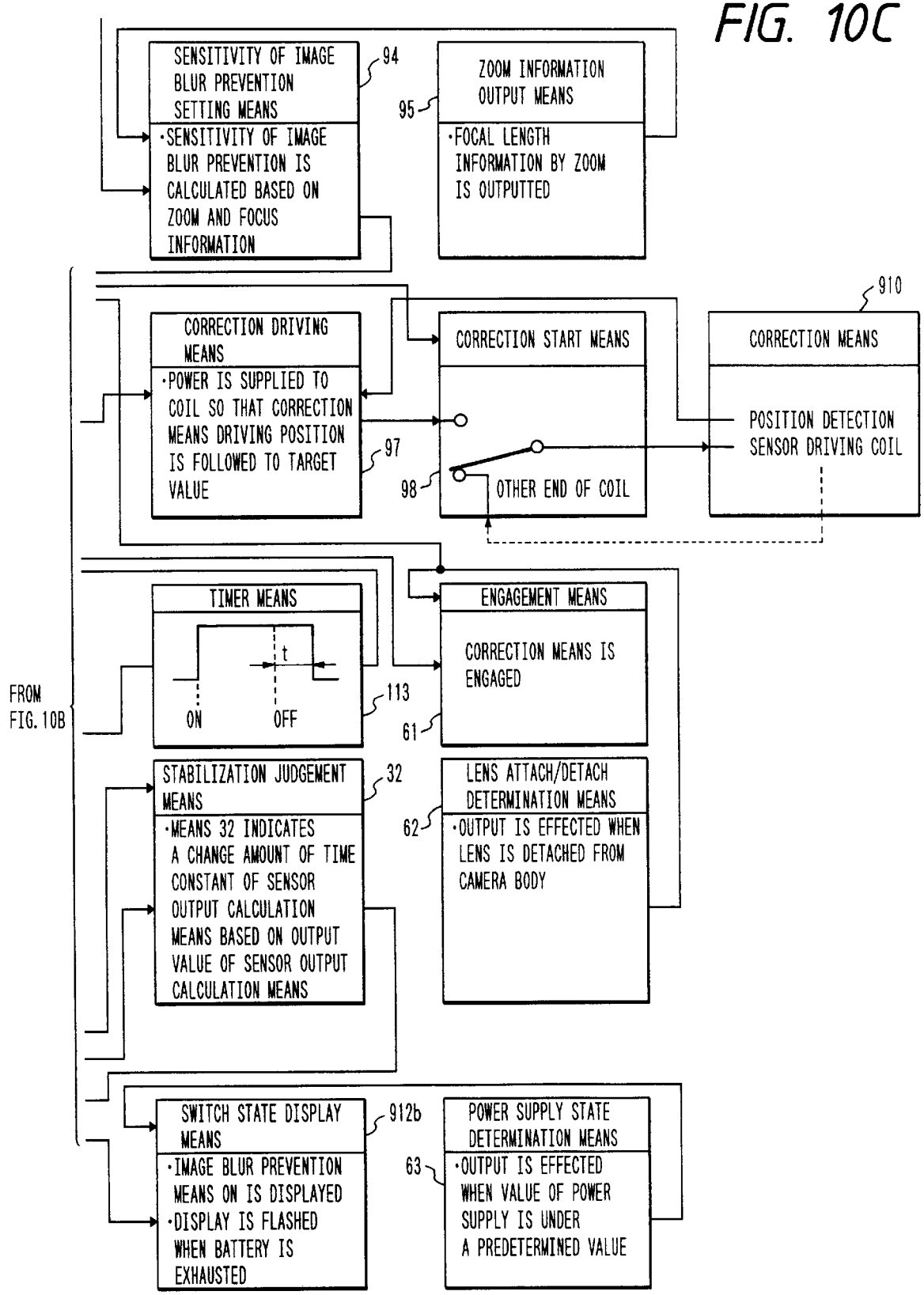
Figure 11B:
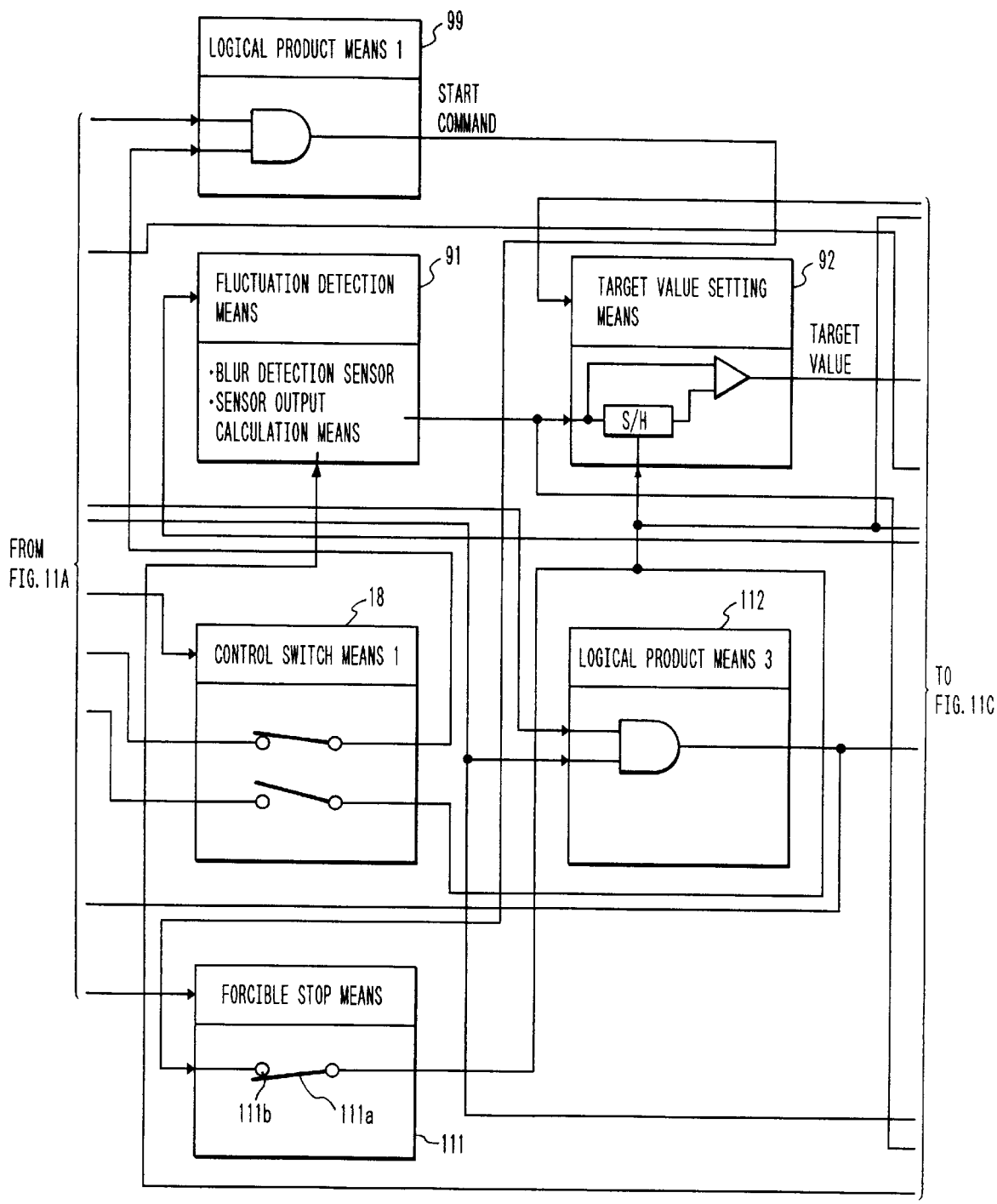
FIG. 11 which is composed of FIGS. 11A to 11C are block diagrams for explaining control operations between components mounted in the camera of the sixth embodiment of the present invention and functions of the camera.
Figure 11C:
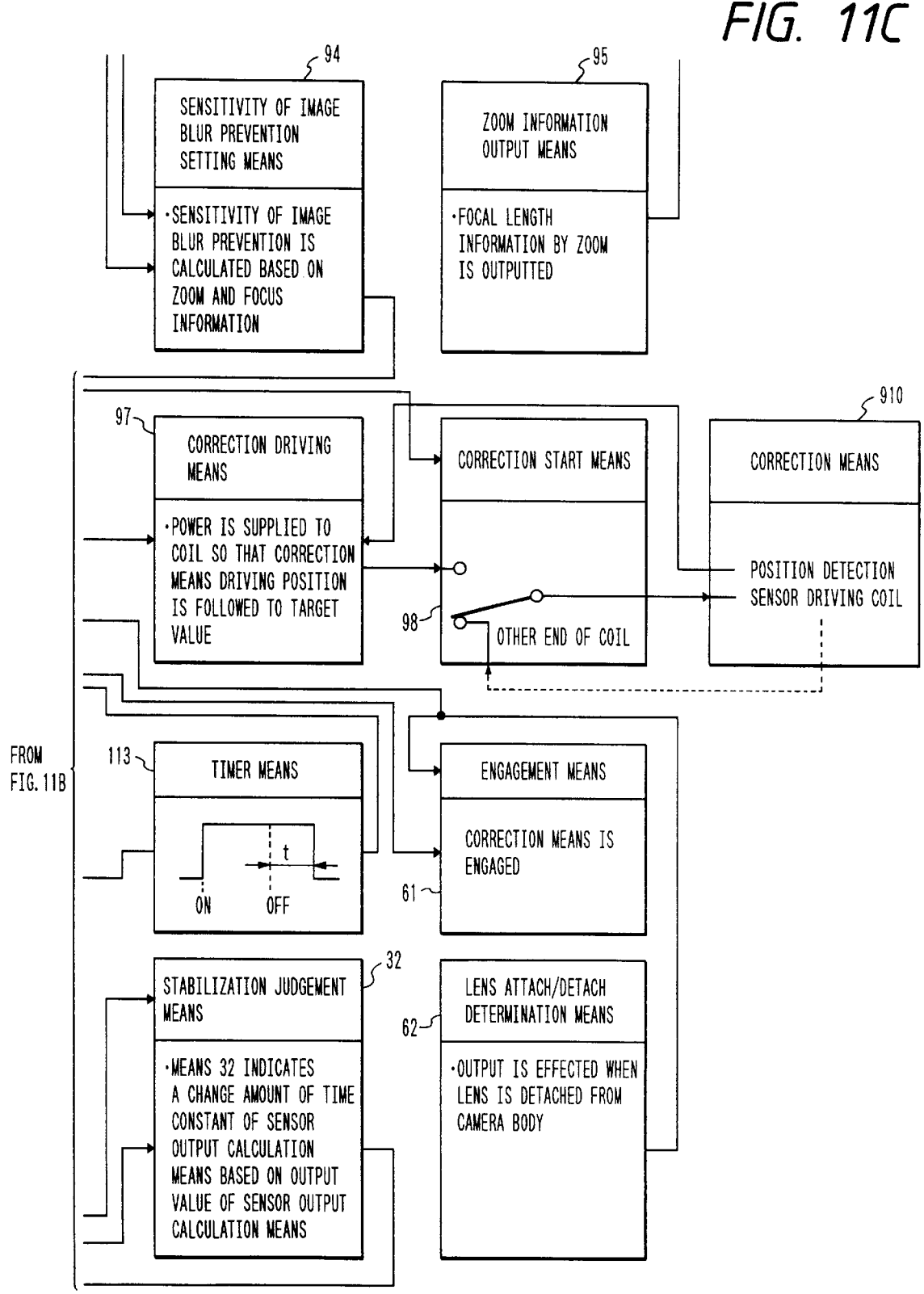

The sixth embodiment of the present invention is shown in FIGS. 11A to 11C. A difference from FIGS. 10A to 10C resides in that the release of the engagement means is effected at start of image blur prevention.

In FIGS. 11A to 11C, the engagement means 61 releases the engagement of the correction means upon output of either the signal from the logical product means 1 (99) (in the case of the camera body with provision for image blur prevention) or the signal from the logical product means 2 (19) (in the case of the camera body without provision for image blur prevention), and effects the engagement when the output becomes absent.

Since the logical product means 1 (99) or the logical product means 2 (19) gives the output upon effecting image blur prevention (upon correction drive of the correction means), the engagement means releases the engagement of the correction means only upon effecting image blur prevention, and only at that time the correction start means 98 is turned on by the signal from the logical product means 1 (99) or the logical product means 2 (19), whereby the correction means turns into the control state to start correction drive.

The present embodiment excludes the state in which the correction means is kept in the control state without being used for image blur correction (upon operation of only the image blur prevention switch means 912), which can save more power, as compared with the configuration of FIGS. 10A to 10C.

<Embodiment 7>

Figure 12B:
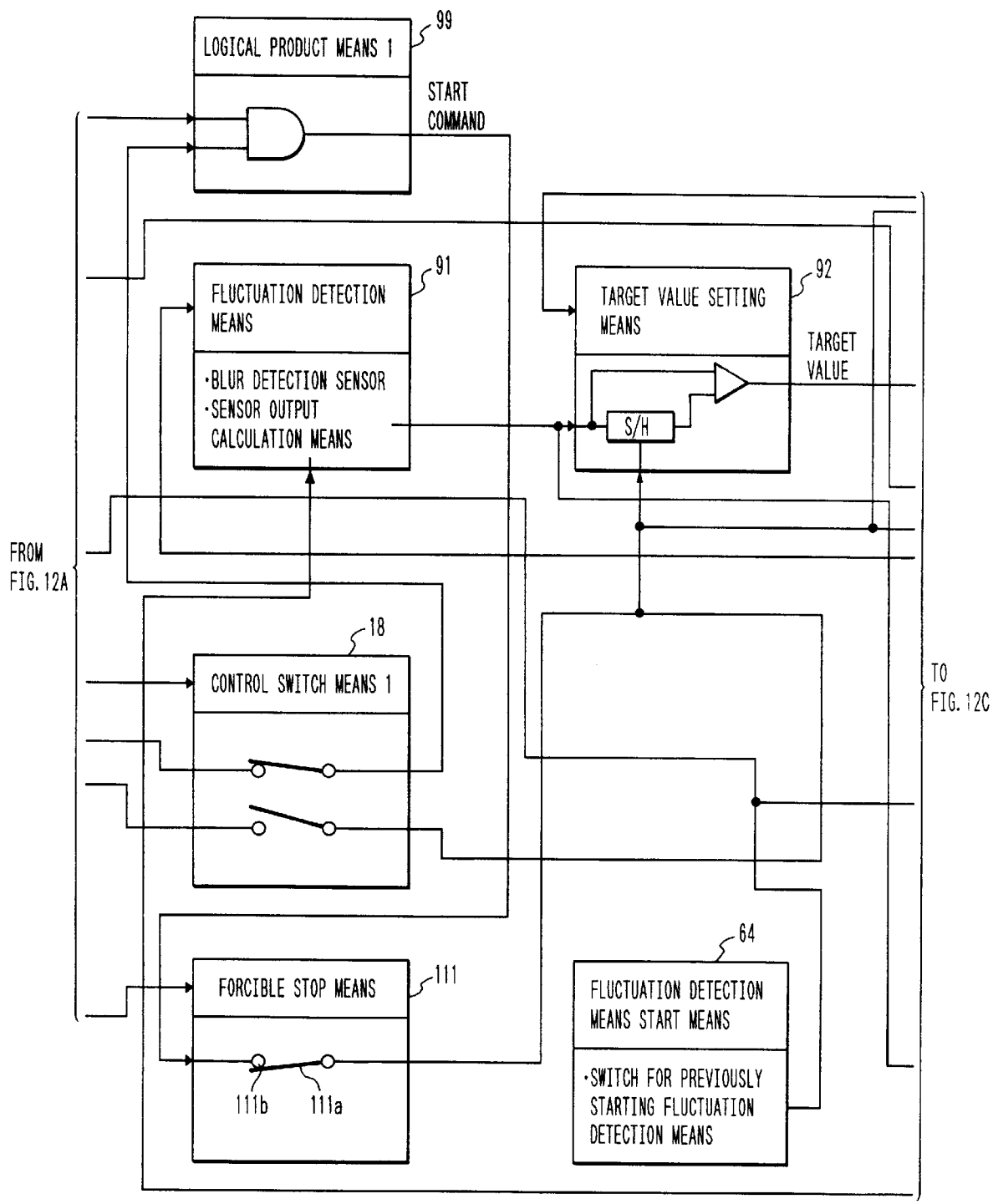
FIG. 12 which is composed of FIGS. 12A to 12C are block diagrams for explaining control operations between components mounted in the camera of the seventh embodiment of the present invention and functions of the camera.
Figure 12C:
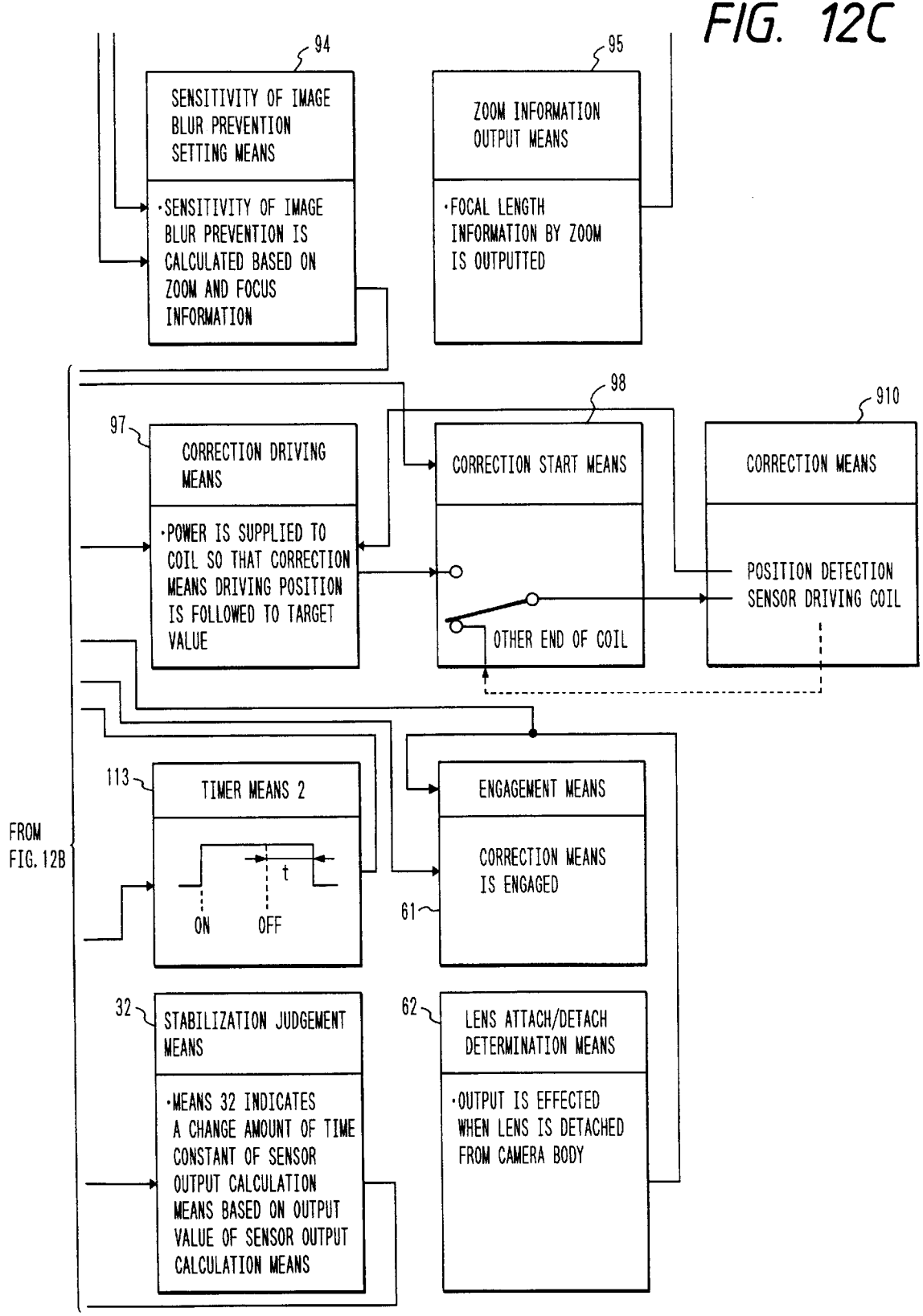
Figure 13:
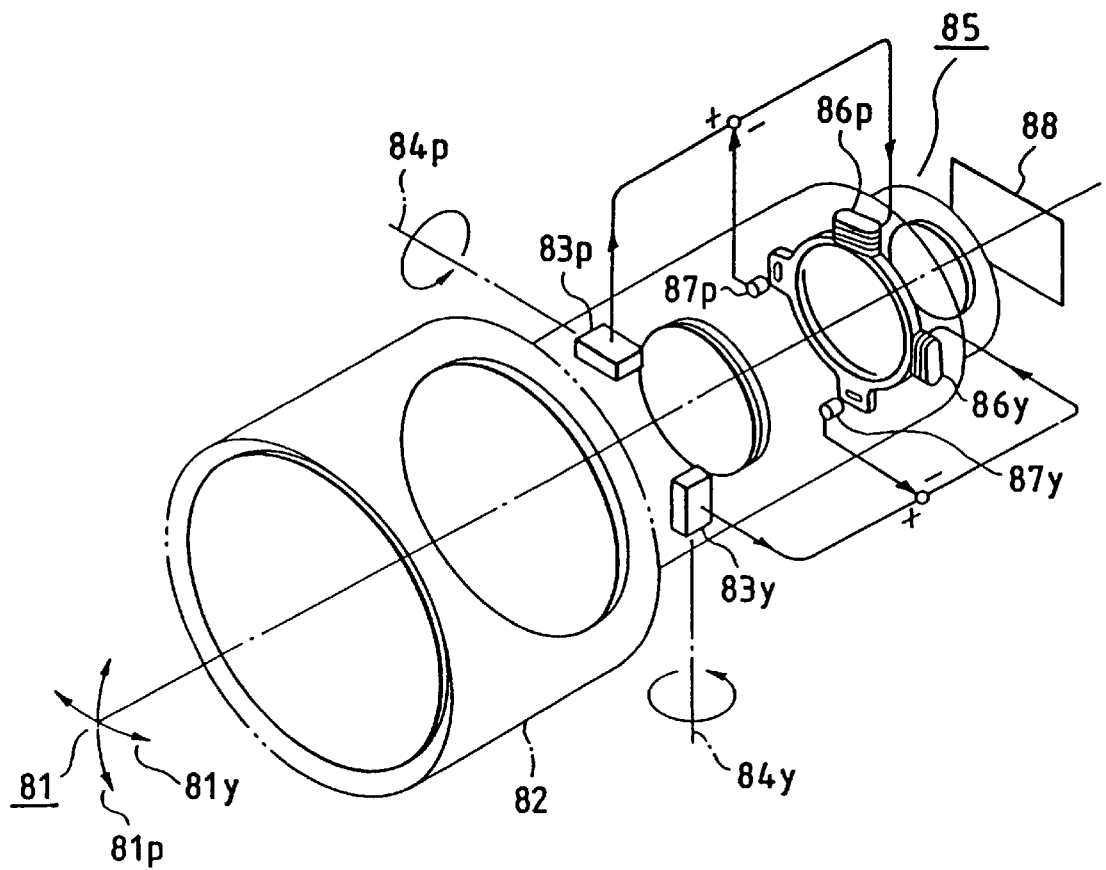
FIG. 13 is a drawing for explaining the schematic structure of the known image blur prevention apparatus mounted in cameras according to the present invention and the conventional cameras.
Figure 15:
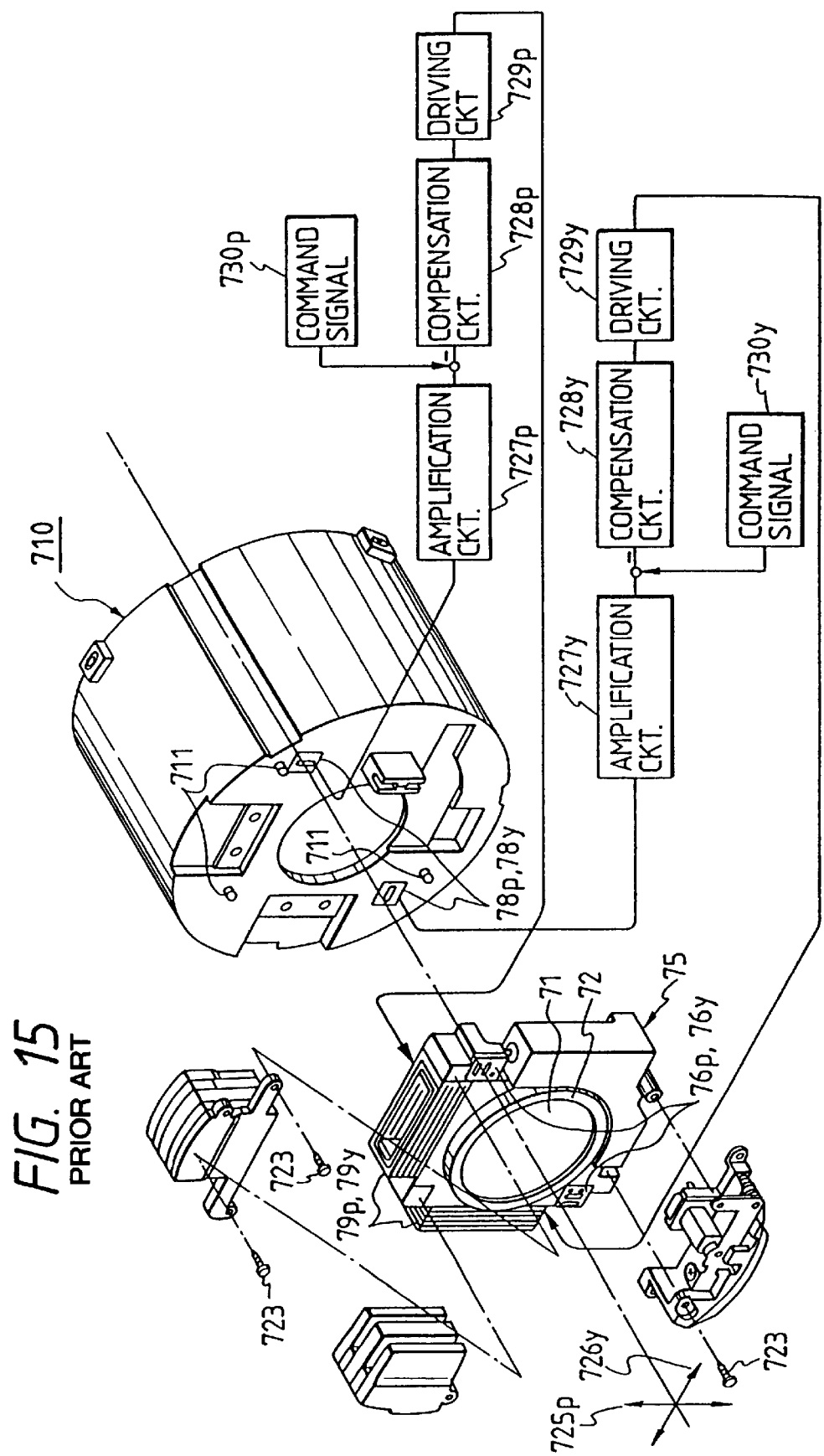
FIG. 15 is a drawing to show an example of the drive control circuit of the correction means shown in FIGS. 14A and 14B.
Figure 16:
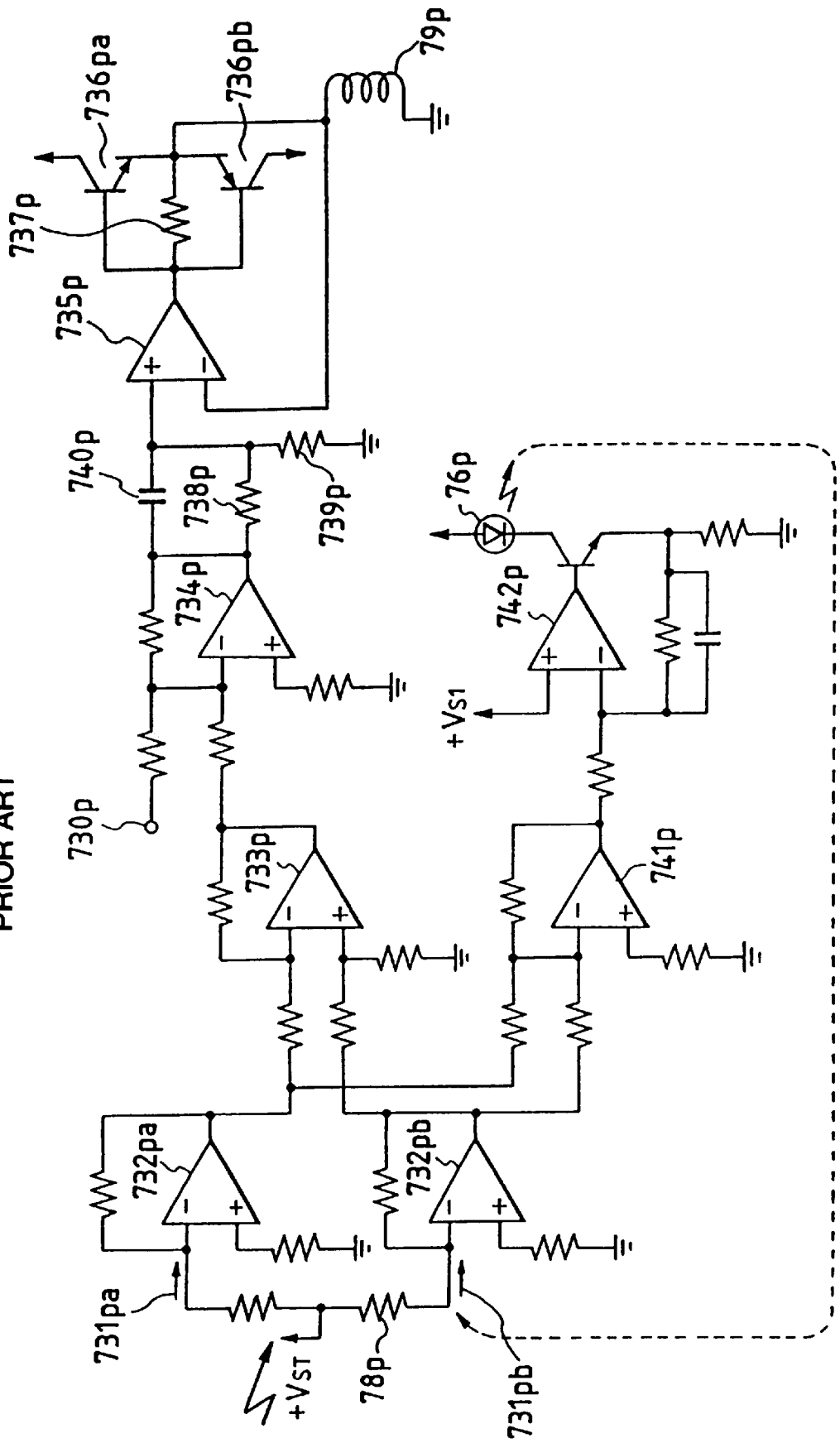
FIG. 16 is a drawing to show a specific example of the circuit shown in FIG. 15.
Figure 17A:
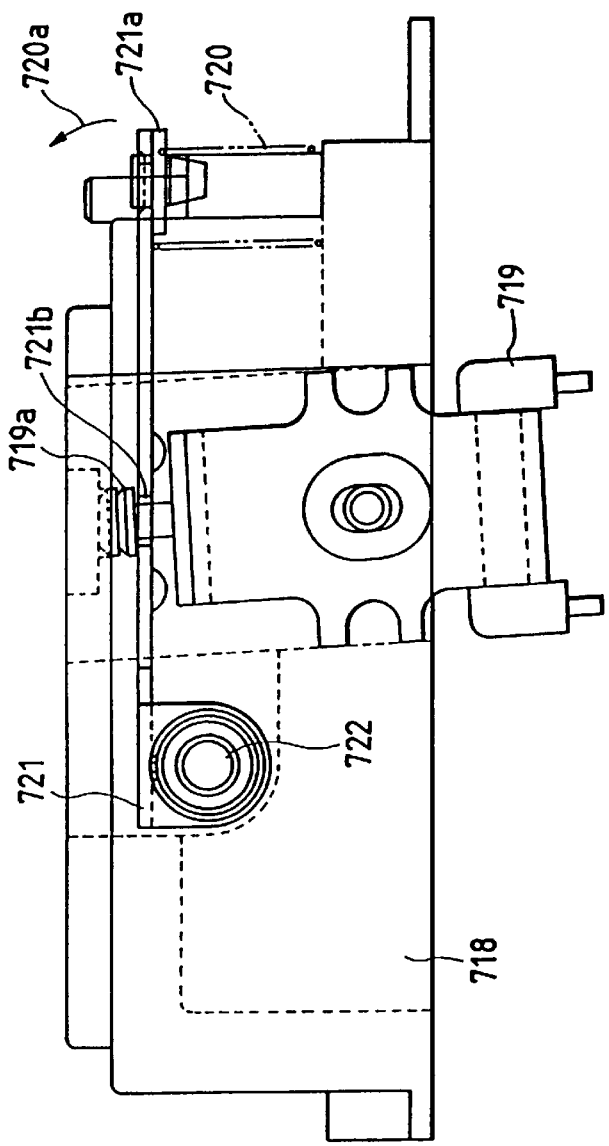
FIG. 17A is an enlarged, plan view of the engagement means 61 shown in FIG. 14A.
Figure 17C:
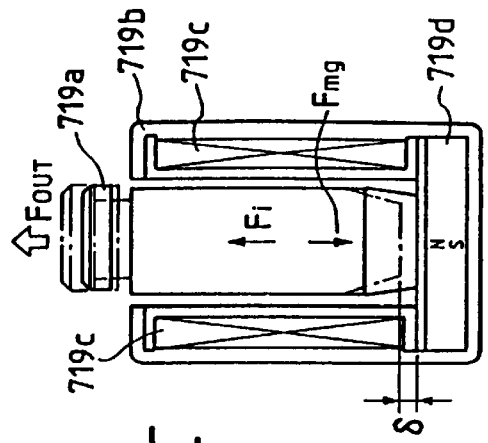
FIG. 17C is a longitudinal cross section for explaining the operation of the electromagnetic plunger 719 of the engagement means 61.
Figure 17B:
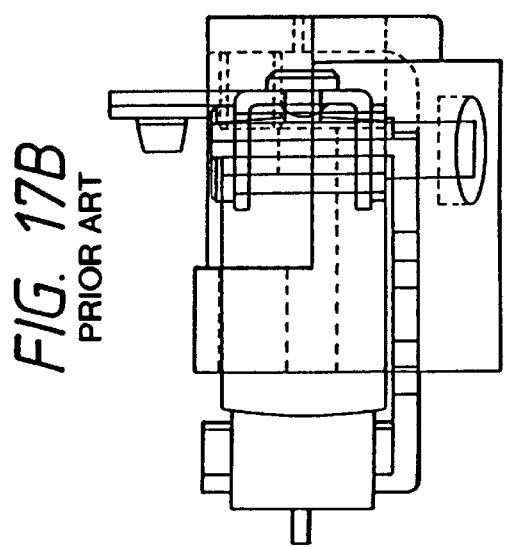
FIG. 17B is a side view of FIG. 17A.

The seventh embodiment of the present invention is shown in FIGS. 12A to 12C. The present embodiment is different from the Embodiments shown in FIGS. 2A to FIG. 11C in that start of the fluctuation detection means can be performed regardless of the image blur prevention.

Since the dissipation power of the fluctuation detecting means itself is small, continuous drive causes little influence on the power supply. Noting this fact, the fluctuation detection means is always driven to stabilize the output, thereby necessitating no waiting time for image blur prevention.

In FIGS. 12A to 12C the signal from SW1 and a signal from a means 64 for starting the fluctuation detection means are arranged to start the fluctuation detection means 91 with intervention of the timer means 113, and the functions of the other blocks are the same as those in FIGS. 11A to 11C.

The fluctuation detection means start means 64, similarly as in the known configuration, is turned off when the other switch operations of the camera body and the lens barrel are not made for a predetermined time, to stop drive of the fluctuation detecting means, thereby preventing shortening of the battery life when the photographer leaves the switch on.

The control modes of the lens switches in the example of FIGS. 12A to 12C are summarized in Table 4.

TABLE 4

Changes of control modes of lens switches (No. 4)

| Presence or absence of communication means for image blur prevention | Start of fluctuation detection means | Start of image blur prevention | Temporary stop of image blur prevention |
|---|---|---|---|
| camera body with communication means | SW1 (second switch means): on; or fluctuation detection means start means 64: on | image blur prevention switch means 912 (first switch means): on; and SW1 (second switch means): on | push switch knob 14a (third switch means): on; or SW1 (second switch means): off |
| camera body without communication means | | image blur prevention switch means 912 (first switch means): on; and push switch knob 14a (third switch means): on | push switch knob 14a (third switch means): off |

The temporary stop of image blur prevention can be performed even if the push switch 912a is off. However, because the correction means is engaged in this case, the time is necessary for again releasing the engagement of the correction means in order to next turn the image blur prevention on.

Further, when the start of the fluctuation detection means is effected by the fluctuation detection means start means 64, the fluctuation detection means is started wherein to photometry, distance measurement, focusing, etc. are irrelevant on the contrary to actuation of SW1. Thus, it presents such a merit that the drive of the fluctuation detection means can be continued even if operations of SW1 are intermittently performed in the focus lock state, for example, at intervals larger than the time constant of the fluctuation detection means.

By changing the switch control modes of image blur prevention depending upon the characteristics of the camera body in this manner, the operability upon image blur prevention photographing can be considerably enhanced.

The above describes the merits of the respective elements for each embodiment shown in FIG. 2A to FIG. 12C, and it is needless to mention that these can be combined as occasion requires without having to be limited to these examples. Further, the output of the body type determination means 16 is not limited to the type or mode of the camera body, but may be modified so as to represent a preferable switch control mode selected by the photographer through operation of the switch 17a.

It is needless to mention that the present invention is by no means limited to the configurations of the above embodiments, but may be applied to any configurations that can achieve the functions as claimed in the appended claims or the functions owned by the configurations of the embodiments.

The above embodiments or technical elements thereof may be used in combination with necessity.

Further, the present invention can be applied to arrangements in which the whole or a part of the configuration of each claim or each embodiment composes a single apparatus, arrangements in which the whole or a part of the configuration of each claim or each embodiment is combined with another apparatus, or elements constituting an apparatus.

The present invention can also be applied to various types of cameras including single-lens reflex cameras, lens shutter cameras, and video cameras, optical equipment or other apparatus except for the cameras, apparatus used in the cameras, optical equipment, or other apparatus, or elements constituting such apparatus.

The present invention can employ any fluctuation detection means that can detect fluctuation, for example selected from an angular acceleration meter, an acceleration meter, an angular velocity meter, a velocity meter, an angular displacement meter, a displacement meter, and a method for detecting the fluctuation itself of image.

The present invention may employ any fluctuation prevention means that can prevent fluctuation, for example selected from a beam changing means such as a shift optical system or a variable angle prism for moving an optical member within a plane vertical to the optical axis, a means for moving the image plane in the plane perpendicular to the optical axis, or a means for correcting the fluctuation by image processing.

What is claimed is:

1. An apparatus adapted to an image blur prevention device for performing image blur prevention, the apparatus comprising:
   a control device that switches at least one part of the image blur prevention device to a non-active state in response to a signal representing a first operation, at a time when a predetermined time has elapsed since the first operation,
   and that inhibits switching of said at least one part of the image blur prevention device to the non-active state in response to a signal representing a second operation executed prior to a lapse of the predetermined time since the first operation.

2. The apparatus according to claim 1, wherein said control device comprises means for inhibiting said at least one part of the image blur prevention device from switching to the non-active state, in response to execution of the second operation before the lapse of the predetermined time since the first operation.

3. The apparatus according to claim 1, wherein said control device comprises means for switching said at least one part of the image blur prevention device from an active state to a non-active state at the time when the predetermined time has elapsed since the first operation.

4. The apparatus according to claim 3, wherein said first operation is an operation of an operation portion for stopping an image blur prevention operation, and said control device comprises means for switching said at least one part of the image blur prevention device from the active state to the non-active state.

5. The apparatus according to claim 4, wherein said second operation is an operation for effecting an image blur prevention operation, and said control device comprises means for regulating switching of said at least one part of the image blur prevention device into the non-active state.

6. The apparatus according to claim 1, wherein said first operation is an release operation of a predetermined operation portion, and said control device comprises means for switching said at least one part of the image blur prevention device to the non-active state.

7. The apparatus according to claim 6, wherein the second operation is a next sequential operation of the predetermined operation portion, and said control device comprises means for regulating switching of said at least one part of the image blur prevention device to the non-active state.

8. The apparatus according to claim 1, wherein the first operation is an operation of a predetermined operation portion of a camera, and said control device comprises means for operating in response to operation of the predetermined operation portion of the camera.

9. The apparatus according to claim 8, wherein the second operation is a release operation of a release operation portion of the camera, and said control device comprises means for operating in response to operation of the release operation portion of the camera.

10. The apparatus according to claim 8, wherein the first operation is an operation of an operation portion for activating a photographing ready operation of a camera, and said control device comprises means for operating in response to operation of the operation portion for actuating a photographing ready operation of the camera.

11. The apparatus according to claim 8, wherein the second operation is a release operation of the predetermined operation portion of the camera, and said control device comprises means for switching said at least one part of the image blur prevention device in response to a release operation of the predetermined operation portion of the camera.

12. The apparatus according to claim 11, wherein the second operation is a next sequential operation of the predetermined operation portion of the camera, and said control device comprises means for regulating the switching of said at least one part of the image blur prevention device to the non-active state in response to execution of the next sequential operation of the predetermined operation portion.

13. The apparatus according to claim 1, wherein the image blur prevention device comprises an image blur detection device that detects image blur and said control device comprises means for controlling a state of the image blur detection device.

14. The apparatus according to claim 13, wherein the image blur detection device comprises means for detecting fluctuation of equipment.

15. The apparatus according to claim 13, wherein the image blur prevention device comprises an operation device that performs an image blur prevention operation in accordance with an output from the image blur detection device.

16. An image blur prevention apparatus comprising:
   an image blur prevention device that performs an image blur prevention operation; and
   a control device that switches at least one part of the image blur prevention device to a non-active state in response to a signal representing a first operation, at a time when a predetermined time has elapsed since the first operation,
   and that inhibits switching of said at least one part of the image blur prevention device to the non-active state in response to a signal representing a second operation executed prior to a lapse of the predetermined time since the first operation.

17. An optical device to which an image blur prevention device is adapted, comprising:
   a control device that switches at least one part of the image blur prevention device to a non-active state in response to a signal representing a first operation, at a time when a predetermined time has elapsed since the first operation,
   and that inhibits switching of said at least one part of the image blur prevention device to the non-active state in response to a signal representing a second operation executed prior to a lapse of the predetermined time since the first operation.

18. A camera to which an image blur prevention device is adapted, the camera comprising:
a control device that switches at least one part of the image blur prevention device to a non-active state in response to a signal representing a first operation, at a time when a predetermined time has elapsed since the first operation, and that inhibits switching of said at least one part of the image blur prevention device to the non-active state in response to a signal representing a second operation executed prior to a lapse of the predetermined time since the first operation.

19. An image blur prevention apparatus which is attachable to a plurality of types of cameras, the apparatus comprising:
an image blur prevention device having a variable driving state;
an operation member located on a body of the image blur prevention apparatus and having a variable operation state;
activation means for changing the driving state of said image blur prevention device in response to a predetermined change in the operation state of said operation member;
determination means for determining a type of camera to which the image blur prevention apparatus is attached; and
means for changing a manner in which said activation means changes the driving state of said image blur prevention device in response to the predetermined change in the operation state of said operation member in accordance with the type of camera to which the image blur prevention apparatus is attached, as determined by said determination device.

20. An apparatus according to claim 19, wherein the image blur prevention device comprises a lens device which is attachable to the plurality of types of cameras.

21. An apparatus according to claim 19, wherein the image blur prevention device comprises means for optically preventing image blur.

22. An apparatus according to claim 19, wherein said determination means comprises means for determining whether the type of camera to which the image blur prevention apparatus is attached performs a predetermined communication with the image blur prevention apparatus.

23. An apparatus according to claim 22, wherein said changing means comprises means for causing the image blur prevention device to operate in accordance with at least the predetermined communication and the operation state of said operation member when said determination means determines that the type of camera to which the image blur prevention apparatus is attached performs the predetermined communication.

24. An image blur prevention apparatus comprising:
an image blur prevention device;
means for starting operation of at least a part of said image blur prevention device by performing a predetermined start-up operation in response to a predetermined operation of a predetermined operation portion;
means for stopping at least the part of the operation of said image blur prevention device responsive to the predetermined operation of the predetermined operation portion in response to a release of the predetermined operation of the predetermined operation portion, said operation stopping means maintaining at least the part of the operation of said image blur prevention device until a predetermined time elapses since the release of the predetermined operation and stopping the operation after the predetermined time elapses; and
activation means for inhibiting said operation stopping means from stopping the operation in response to the release of the predetermined operation, not performing the predetermined start-up operation in response to the predetermined operation, and continuing at least a part of an operation of said image blur prevention device, when the predetermined operation of the predetermined operation portion is performed again before the predetermined time elapses since the release of the predetermined operation.

25. An apparatus according to claim 24, wherein said image blur prevention device includes fluctuation detection means for detecting a fluctuation of an apparatus.

26. An apparatus according to claim 25, wherein said image blur prevention device includes image blur correction means for correcting an image blur in accordance with an output of said fluctuation detection means.

27. An apparatus according to claim 25, wherein said operation starting means includes means for starting said fluctuation detection means and said operation stopping means includes means for stopping a detection operation of said fluctuation detection means.

28. An apparatus according to claim 27, wherein said fluctuation detection means includes a fluctuation detection sensor and a signal processing circuit which performs a predetermined signal processing of a detection signal of said fluctuation detection sensor and said operation starting means includes means for starting the detection operation of said fluctuation detection sensor and for making a signal processing characteristic of said signal processing circuit after the predetermined start-up operation different from a characteristic during the fluctuation detection operation of the predetermined start-up operation.

29. An apparatus according to claim 28, wherein said operation starting means includes means for changing a signal processing frequency characteristic of said signal processing circuit during the fluctuation detection operation, as said predetermined start-up operation.

30. An apparatus according to claim 28, wherein said operation starting means includes means for changing a time constant of said signal processing circuit during the fluctuation detection operation, as said predetermined start-up operation.

31. An apparatus according to claim 30, wherein said operation starting means includes means for setting a time constant of said signal processing circuit at a time after the fluctuation detection operation less than a time constant during the fluctuation detection operation, as said predetermined start-up operation.

32. An apparatus according to claim 28, wherein said signal processing circuit includes an integral circuit.

33. An apparatus according to claim 28, wherein said signal processing circuit includes a high pass filter.

34. An apparatus according to claim 28, wherein said operation starting means includes means for setting the signal processing frequency characteristic of said signal processing circuit during the fluctuation detection operation when said predetermined start-up operation is completed.

35. An apparatus according to claim 24, wherein said operation starting means includes means for performing the starting operation in response to a predetermined operation of a release operation portion of a camera.

36. An apparatus according to claim 35, wherein said operation starting means includes means for starting operation in response to a photographing preparation operation of the release operation portion of the camera.

37. An apparatus according to claim 24, wherein said operation stopping means includes a timer for counting time in response to the release of the predetermined operation of said predetermined operation portion and means for stopping at least a part of the operation of said image blur prevention device.

* * * * *

UNITED STATES PATENT AND TRADEMARK OFFICE
CERTIFICATE OF CORRECTION

PATENT NO. : 6,122,447

DATED : September 19, 2000

INVENTOR(S): KOICHI WASHISU

It is certified that error appears in the above-identified patent and that said Letters Patent is hereby corrected as shown below:

COLUMN 1:

Line 27, "of," should read --of--.
    Line 28, "known,a" should read --known--.
    Line 51, "the" should be deleted.
    Line 59, "the" should be deleted.
    Line 65, "74y a" should read --74ya--.

COLUMN 3:

Line 13, "as" should be deleted.
    Line 26, "earns" should read --determines--.

COLUMN 4:

Line 2, "71a" should read --719a--.

COLUMN 5:

Line 5, "in" should be deleted.
    Line 43, "the" should be deleted.
    Line 46, "turn" should read --switch--.

UNITED STATES PATENT AND TRADEMARK OFFICE
CERTIFICATE OF CORRECTION

PATENT NO. : 6,122,447

DATED : September 19, 2000

INVENTOR(S): KOICHI WASHISU

It is certified that error appears in the above-identified patent and that said Letters Patent is hereby corrected as shown below:

COLUMN 5:

Line 47, "into" should read --to--.

COLUMN 6:

Line 55, "m(de" should read --mode--.
    Line 61, "a" should be deleted, and
            "the" should read --a--.
    Line 67, "camera." should read --camera:--.

COLUMN 7:

Line 11, "the" should be deleted.
    Line 48, "as" should read --while--.

COLUMN 8:

Line 52, "which" should be deleted, and
            "are" should read --which are--.
    Line 66, "which" should be deleted, and
            "are" should read --which are--.

UNITED STATES PATENT AND TRADEMARK OFFICE
CERTIFICATE OF CORRECTION

PATENT NO. : 6,122,447

DATED : September 19, 2000

INVENTOR(S): KOICHI WASHISU

It is certified that error appears in the above-identified patent and that said Letters Patent is hereby corrected as shown below:

COLUMN 9:

Line 6, "which" should be deleted, and "are" should read --which are--.

Line 10, "which" should be deleted, and "are" should read --which are--.

Line 17, "which" should be deleted, and "are" should read --which are--.

Line 21, "which" should be deleted, and "are" should read --which are--.

Line 26, "which" should be deleted, and "are" should read --which are--.

Line 49, "which" should be deleted, and "are" should read --which are--.

UNITED STATES PATENT AND TRADEMARK OFFICE
CERTIFICATE OF CORRECTION

PATENT NO. : 6,122,447

DATED : September 19, 2000

INVENTOR(S): KOICHI WASHISU

It is certified that error appears in the above-identified patent and that said Letters Patent is hereby corrected as shown below:

COLUMN 10:

Line 26, "make" should read --turn--.
    Line 42, "with" should read --by--.

COLUMN 11:

Line 11, "terminal 10b," should read --terminal 110b,--.
    Line 39, "example" should read --example,--.

COLUMN 13:

Line 5, "heretofore, then" should read
        --heretofore. Then--.

Line 24, "release means, 911" should read
        --release means 911--.

Line 53, "terminal 10b." should read --terminal 110b.--.
    Line 66, "sequence as" should be delete.

COLUMN 14:

Line 7, "correction means 91" should read --correction means 910--.

UNITED STATES PATENT AND TRADEMARK OFFICE
CERTIFICATE OF CORRECTION

PATENT NO. : 6,122,447

DATED : September 19, 2000

INVENTOR(S): KOICHI WASHISU

It is certified that error appears in the above-identified patent and that said Letters Patent is hereby corrected as shown below:

COLUMN 14:

Line 34, "setting means 92" should read --setting means 92,--.

COLUMN 15:

Line 35, "known," should read --known--.
    Line 58, "as" should read --, such as--.

COLUMN 17:

Line 8, "started, once" should read --started once,--.

COLUMN 18:

Line 45, "yet" should be deleted.
    Line 47, "stabilized" should read --stabilized,--.
    Line 52, "stabilized," should read --stabilized--.
    Line 57, "soon." should read --quickly.--.

UNITED STATES PATENT AND TRADEMARK OFFICE
CERTIFICATE OF CORRECTION

PATENT NO. : 6,122,447

DATED : September 19, 2000

INVENTOR(S): KOICHI WASHISU

It is certified that error appears in the above-identified patent and that said Letters Patent is hereby corrected as shown below:

<u>COLUMN 19</u>:

Line 16, "degree" should read --degree,--.
    Line 35, "along" should read --during--.
    Line 58, "determination means 161" should read
        --determination means 16'--.

<u>COLUMN 21</u>:

Line 23, "drive," should read --to drive,--.
    Line 29, "cases," should read --cases--.

<u>COLUMN 22</u>:

Line 18, "Switch" should read --switch--.

<u>COLUMN 23</u>:

Line 28, "correction drive" should read --correction
        driving--.
    Line 35, "drive." should read "driving.--.

UNITED STATES PATENT AND TRADEMARK OFFICE
CERTIFICATE OF CORRECTION

PATENT NO. : 6,122,447

DATED : September 19, 2000

INVENTOR(S): KOICHI WASHISU

It is certified that error appears in the above-identified patent and that said Letters Patent is hereby corrected as shown below:

COLUMN 23:

Line 45, "FIGS. 2A" should read --FIG. 2A--.

COLUMN 24:

Line 36, "to" should be deleted.
    Line 64, "with necessity." should read
        --, as necessary.--.

Signed and Sealed this

Twenty-second Day of May, 2001

*Attest:*

NICHOLAS P. GODICI

*Attesting Officer*      *Acting Director of the United States Patent and Trademark Office*